United States Patent
Yonezawa et al.

(10) Patent No.: US 11,557,030 B2
(45) Date of Patent: Jan. 17, 2023

(54) DEVICE, METHOD, AND SYSTEM FOR DISPLAYING A COMBINED IMAGE REPRESENTING A POSITION OF SENSOR HAVING DEFECT AND A VEHICLE

(71) Applicant: SONY SEMICONDUCTOR SOLUTIONS CORPORATION, Kanagawa (JP)

(72) Inventors: Kota Yonezawa, Kanagawa (JP); Satoshi Nakayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/733,875

(22) PCT Filed: May 24, 2019

(86) PCT No.: PCT/JP2019/020586
§ 371 (c)(1),
(2) Date: Nov. 30, 2020

(87) PCT Pub. No.: WO2019/235245
PCT Pub. Date: Dec. 12, 2019

(65) Prior Publication Data
US 2021/0224976 A1    Jul. 22, 2021

(30) Foreign Application Priority Data
Jun. 7, 2018   (JP) .............................. JP2018-109523

(51) Int. Cl.
*G06T 7/00* (2017.01)
*G06T 7/73* (2017.01)
(Continued)

(52) U.S. Cl.
CPC ............ *G06T 7/0008* (2013.01); *B60K 35/00* (2013.01); *G06T 5/50* (2013.01); *G06T 7/73* (2017.01);
(Continued)

(58) Field of Classification Search
CPC .............. B60K 35/00; B60K 2370/566; B60K 2370/162; B60K 2370/171;
(Continued)

(56) References Cited

U.S. PATENT DOCUMENTS 6,550,949 B1 *   4/2003   Bauer .................. B60Q 1/0023
362/800
2009/0237268 A1   9/2009   Tomoyuki et al.
(Continued)

FOREIGN PATENT DOCUMENTS

| CN | 103533231 A | 1/2014 |
| CN | 104822568 A | 8/2015 |

(Continued)

OTHER PUBLICATIONS

Extended European Search Report of EP Application No. 19815404.9, dated Jul. 7, 2021, 09 pages.
(Continued)

*Primary Examiner* — Geoffrey E Summers
(74) *Attorney, Agent, or Firm* — Chip Law Group

(57) ABSTRACT

The present technology relates to an information processing device, an information processing method, and an information processing system by which a user can easily recognize a position of a sensor having a defect from among sensors mounted on a vehicle. Position-related information about a relative position or direction with respect to a vehicle is acquired, and a combined image obtained by combining a defect image representing a position of the sensor having a defect from among the sensors mounted on the vehicle with
(Continued)

a vehicle image reflecting the vehicle is displayed in response to the position-related information. The present technology can be applied so that a user can recognize a sensor having a defect from among the sensors mounted on a vehicle.

15 Claims, 12 Drawing Sheets

(51) Int. Cl.
*G06T 5/50* (2006.01)
*B60K 35/00* (2006.01)
*G06T 19/00* (2011.01)

(52) U.S. Cl.
CPC .............. *G06T 7/97* (2017.01); *G06T 19/006* (2013.01); *B60K 2370/566* (2019.05); *G06T 2207/30252* (2013.01); *G06T 2219/004* (2013.01)

(58) Field of Classification Search
CPC .......... B60K 2370/55; B60K 2370/573; B60K 37/06; B60K 2370/152; B60K 2370/52; B60R 16/0234; B60R 2300/105; B60R 2300/304; B60R 2300/50; B60R 2300/607; B60R 1/00; B60R 11/02; B60R 16/02; B60S 3/04; B60S 1/56; B60Y 2400/30; G05G 1/16; H04W 4/48; G06T 2207/30248–30268; G06T 7/0002–001; G06T 5/50; G06T 7/73; G06T 7/97; G06T 19/00–20; G06T 2219/004; G06V 20/20; G06K 9/00
See application file for complete search history.

(56) References Cited

U.S. PATENT DOCUMENTS

| | | | |
|---|---|---|---|
| 2014/0232869 A1* | 8/2014 | May | G06T 7/70 348/148 |
| 2015/0371455 A1* | 12/2015 | Abdel-Rahman | G06F 16/951 701/29.1 |
| 2016/0165148 A1 | 6/2016 | Itoh et al. | |
| 2018/0061137 A1 | 3/2018 | Jung | |
| 2018/0089907 A1 | 3/2018 | Maruoka et al. | |
| 2018/0315167 A1 | 11/2018 | Akiyama et al. | |
| 2018/0342054 A1* | 11/2018 | Wagstaff | G06V 10/82 |
| 2019/0066408 A1* | 2/2019 | Vijayan | G06F 30/15 |
| 2019/0149813 A1* | 5/2019 | Sun | G03B 43/00 348/187 |
| 2019/0196680 A1* | 6/2019 | Park | G06Q 10/20 |
| 2019/0251747 A1* | 8/2019 | Yin | G06T 7/74 |
| 2019/0279438 A1* | 9/2019 | Swenson | G06F 3/04815 |

FOREIGN PATENT DOCUMENTS

| | | | | |
|---|---|---|---|---|
| CN | 107878327 A | 4/2018 | | |
| DE | 102017117243 A1 | 3/2018 | | |
| EP | 3373243 A1 | 9/2018 | | |
| JP | 2003-259358 A | 9/2003 | | |
| JP | 2006-246515 A | 9/2006 | | |
| JP | 2009-225322 A | 10/2009 | | |
| JP | 2011-223075 A | 11/2011 | | |
| JP | 2012-106557 A | 6/2012 | | |
| JP | 5521990 B2 | 6/2014 | | |
| JP | 5546321 B2 | 7/2014 | | |
| JP | 2015-019271 A | 1/2015 | | |
| JP | 2017-092622 A | 5/2017 | | |
| JP | 2018-056794 A | 4/2018 | | |
| KR | 10-2009-0100188 A | 9/2009 | | |
| KR | 20160091168 A | * | 8/2016 | ............ G06T 19/006 |
| KR | 20170032898 A | * | 3/2017 | ............ B60W 50/02 |
| KR | 10-2018-0024469 A | 3/2018 | | |
| WO | 2015/004907 A1 | 1/2015 | | |

OTHER PUBLICATIONS

International Search Report and Written Opinion of PCT Application No. PCT/JP2019/020586, dated Jul. 9, 2019, 07 pages of ISRWO.

* cited by examiner

DEVICE, METHOD, AND SYSTEM FOR DISPLAYING A COMBINED IMAGE REPRESENTING A POSITION OF SENSOR HAVING DEFECT AND A VEHICLE

CROSS REFERENCE TO RELATED APPLICATIONS

This application is a U.S. National Phase of International Patent Application No. PCT/JP2019/020586 filed on May 24, 2019, which claims priority benefit of Japanese Patent Application No. JP 2018-109523 filed in the Japan Patent Office on Jun. 7, 2018. Each of the above-referenced applications is hereby incorporated herein by reference in its entirety.

TECHNICAL FIELD

The present technology relates to an information processing device, an information processing method, and an information processing system, and particularly, to an information processing device, an information processing method, and an information processing system by which a user can easily recognize, for example, a position of a sensor at which there is a defect from among sensors mounted on a vehicle.

BACKGROUND ART

Recently, a large number of sensors such as cameras have been provided outside a vehicle such as a four-wheeled vehicle for driving assistance and the like such as with an automatic brake.

Dirt easily adheres to sensors provided outside a vehicle, and dirt adhering to a sensor hinders sensing of the sensor and thus it is necessary to clean such dirt adhering to a sensor.

For example, PTL 1 proposes a technology for displaying an image captured using a camera as a sensor on a portable terminal and notifying a user of a contamination state of the sensor.

CITATION LIST

Patent Literature

[PTL 1]
JP 2012-106557A

SUMMARY

Technical Problem

When an image captured by a camera as a sensor is displayed on a portable terminal, a user can recognize that the camera has dirt but has difficulty recognizing the position (position in a vehicle) at which the camera having dirt is mounted. Accordingly, it is difficult for the user to clean the dirt adhering to the sensor when the position of the camera having the dirt is unclear.

In view of such situations, the present technology causes a user to be able to easily recognize a position of a sensor having a defect such as dirt from among sensors mounted on a vehicle.

Solution to Problem

An information processing device of the present technology is an information processing device including: a position-related information acquisition unit configured to acquire position-related information about a relative position or direction with respect to a vehicle, and a display controller configured to display a combined image obtained by combining a defect image representing a position of a sensor having a defect from among sensors mounted on the vehicle with a vehicle image reflecting the vehicle in response to the position-related information.

An information processing method of the present technology is an information processing method including: acquiring position-related information about a relative position or direction with respect to a vehicle; and displaying a combined image obtained by combining a defect image representing a position of a sensor having a defect from among sensors mounted on the vehicle with a vehicle image reflecting the vehicle in response to the position-related information.

An information processing system of the present technology is an information processing system including: a sensor configured to be mounted on a vehicle; a defect detector configured to detect a defect of the sensor; a display unit configured to display an image; a position-related information acquisition unit configured to acquire position-related information about a relative position or direction with respect to the vehicle; and a display controller configured to display a combined image obtained by combining a defect image representing a position of a sensor having a defect from among sensors mounted on the vehicle with a vehicle image reflecting the vehicle in response to the position-related information.

In the information processing device, the information processing method, and the information processing system of the present technology, position-related information about a relative position or direction with respect to a vehicle is acquired, and a combined image obtained by combining a defect image representing a position of a sensor having a defect from among sensors mounted on the vehicle with a vehicle image reflecting the vehicle is displayed in response to the position-related information.

Note that the information processing device may be an independent device or may be an internal block constituting a single device.

In addition, the information processing device can be realized by making a computer to execute a program. The program can be provided by being transmitted through a transmission medium or by being recorded in a recording medium.

Advantageous Effects of Invention

According to the present technology, a user can easily recognize a position of a sensor having a defect from among sensors mounted on a vehicle.

The effects described herein are not necessarily limiting and any effect described in the present disclosure may be obtained.

DESCRIPTION OF EMBODIMENTS

<One Embodiment of Information Processing System to which Present Technology is Applied>

Figure 1:
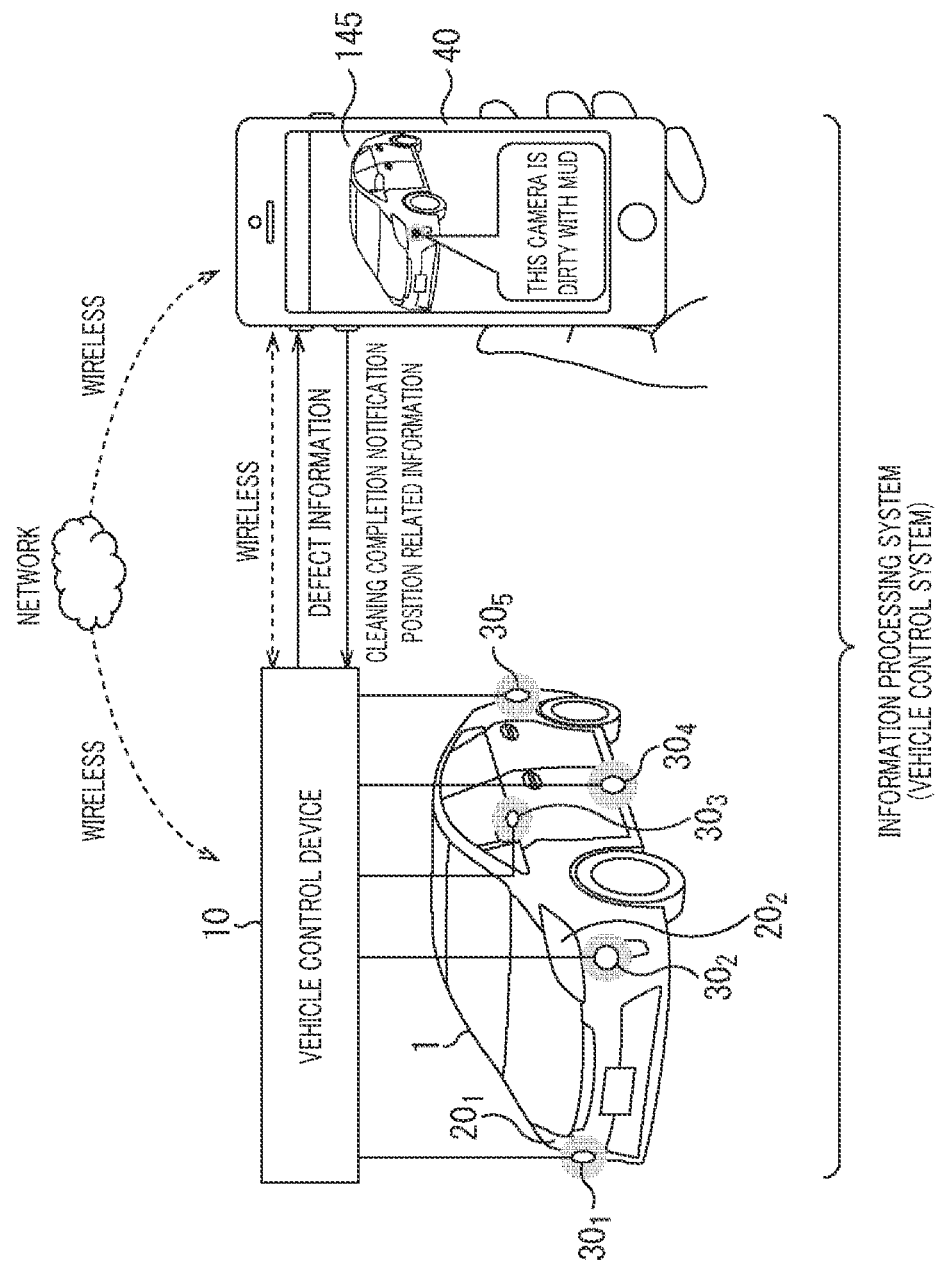
FIG. 1 is a diagram showing an overview of one embodiment of a vehicle control system as an information processing system to which the present technology is applied.

FIG. 1 is a diagram showing an overview of one embodiment of a vehicle control system as an information processing system to which the present technology is applied.

In FIG. 1, the vehicle control system includes a vehicle 1 and a vehicle exterior terminal 40.

The vehicle 1 is a four-wheeled car, for example, and includes a vehicle control device 10. Further, the vehicle 1 is equipped with on-board lights $20_1$ and $20_2$ as light-emitting parts attached to the vehicle 1, such as headlights, taillights, light emitting diodes (LEDs) and lamps, and sensors $30_1$, $30_2$, $30_3$, $30_4$, and $30_5$ and the like such as cameras outside the vehicle.

The vehicle control device 10 performs various types of control such as driving assistance in response to sensor information supplied from sensors $30_i$ (i=1, 2, 3, 4, 5 in the present embodiment). In addition, the vehicle control device 10 performs control such as turning on and turning off of the on-board lights $20_1$ and $20_2$.

Further, the vehicle control device 10 performs wireless communication with the vehicle exterior terminal 40 to exchange various types of information.

For example, the vehicle control device 10 detects a defect of a sensor $30_i$ in response to the sensor information from the sensors $30_i$, generates defect information including a position of the sensor $30_i$ (on the vehicle 1) having the defect, and the like and transmits the defect information to the vehicle exterior terminal 40. In addition, the vehicle control device 10 receives position-related information and a cleaning completion notification transmitted from the vehicle exterior terminal 40.

The vehicle control device 10 turns on an on-board light $20_j$ (j=1, 2 in the present embodiment) close to the sensor $30_i$ having the defect in response to the position-related information from the vehicle exterior terminal 40. In addition, the vehicle control device 10 turns off the on-board light $20_j$ in response to the cleaning completion notification from the vehicle exterior terminal 40.

The vehicle exterior terminal 40 is, for example, an information processing device such as a portable terminal that can be carried by a user (e.g., a driver of the vehicle 1, or the like) of a smartphone or the like and performs wireless communication with the vehicle control device 10 to exchange various types of information.

For example, the vehicle exterior terminal 40 acquires position-related information about a relative position or direction of the vehicle exterior terminal 40 with respect to the vehicle and transmits the position-related information to the vehicle control device 10. In addition, the vehicle exterior terminal 40 transmits a cleaning completion notification representing that cleaning of, for example, dirt as a defect of a sensor $30_i$ is completed to the vehicle control device 10 in response to an operation of a user.

Further, the vehicle exterior terminal 40 receives defect information transmitted from the vehicle control device 10. The vehicle exterior terminal 40 generates a defect image representing a position of a sensor $30_i$ having a defect from the defect information from the vehicle control device 10 and combines the defect image with a vehicle image reflecting the vehicle 1 in response to position-related information. In addition, the vehicle exterior terminal 40 causes a display unit 145 to display a combined image obtained by combining the defect image with the vehicle image.

In FIG. 1, in the vehicle exterior terminal 40, a blackened circular image indicating the position of a sensor $30_i$ having a defect on the vehicle 1 and a balloon image in which a message "This camera is dirty with mud" is written are used as a defect image, and this defect image and a vehicle image are combined (superposed) and displayed as a combined image.

As described above, in the vehicle control system of FIG. 1, a user can easily recognize the position of a sensor $30_i$ having a defect from among sensors $30_1$ to $30_5$ mounted on the vehicle 1 by carrying the vehicle exterior terminal 40 outside the vehicle and viewing a combined image because the vehicle exterior terminal 40 displays the combined image obtained by combining the vehicle image reflecting the vehicle 1 and a defect image indicating the position of the sensor $30_i$ having a defect mounted on the vehicle 1.

Here, when the vehicle control device 10 detects a defect such as dirt on the sensor $30_i$ on the vehicle 1 on which the sensor $30_i$ is mounted outside the vehicle, there are cases in which the user needs to exit the vehicle and clean the sensor $30_i$. For example, when the vehicle 1 is not equipped with a cleaning system for automatically cleaning the sensor $30_i$ with water, a cleaning solution, air, or the like or when the dirt on the sensor $30_i$ cannot be removed using such a cleaning system even when the vehicle is equipped with the cleaning system, the user needs to exit the vehicle and clean the sensor $30_i$.

When the user exits the vehicle and cleans the sensor $30_i$, the user needs to recognize the position of the sensor $30_i$ having dirt on the vehicle 1 and the condition of dirt as necessary. When information on the dirt on the sensor $30_i$ is displayed on an in-vehicle display of the vehicle 1, the user needs to view the display on the display, memorize the position of the sensor $30_i$ having dirt or the condition of dirt and additionally exit the vehicle to find and clean the sensor $30_i$ having dirt. In addition, the user needs to return from the outside of the vehicle to the inside of the vehicle and confirm whether the vehicle control device 10 determines that the dirt on the sensor $30_i$ has been eliminated and the sensor $30_i$ now has no problems after cleaning of the sensor $30_i$ having dirt, that is, whether the dirt on the sensor $30_i$ is no longer detected.

Further, when the vehicle 1 is realized as a self-driving vehicle in the future, the number of sensors $30_i$ mounted on the vehicle 1 is expected to increase and the sizes of the sensors $30_i$ are expected to decrease in order to improve robustness of sensing. In addition, it is expected that people will have more opportunities to use vehicles that they do not own themselves, such as automatically allocated taxis and vehicles for car sharing, in the world in which self-driving vehicles are distributed. In this way, it is expected to take time for the user using the vehicle 1 to find the sensor $30_i$ having dirt when the vehicle 1 is not the user's own vehicle because the user does is not familiar with the position of the sensor $30_i$ on the vehicle 1 on which the sensor $30_i$ is mounted or a mounted state of the sensor $30_i$.

Accordingly, a method for causing the user to recognize the position of the sensor $30_i$ having dirt, for example, by blinking a light (e.g., an on-board light 20 or the like) at a position close to the sensor $30_i$ having dirt or outputting a sound at a position close to the sensor $30_i$ having dirt may be conceived.

However, when the number of sensors $30_i$ mounted on the vehicle 1 increases, as described above, a large number of sensors $30_i$ may be present close to lights. In this case, it may be difficult for the user to easily recognize the position of the sensor $30_i$ having dirt even when a light at a position close to the sensor $30_i$ having dirt is blinked.

Accordingly, in the vehicle control system of FIG. 1, a combined image obtained by combining the vehicle image reflecting the vehicle 1 with the defect image representing the position of the sensor $30_i$ having a defect mounted on the vehicle 1 is displayed on the portable vehicle exterior terminal 40, as described above. In this case, the user can easily recognize the position of the sensor $30_i$ having a defect such as dirt from among the sensors $30_1$ to $30_5$ mounted on the vehicle 1 by carrying the vehicle exterior terminal 40 outside the vehicle and viewing the combined image.

Note that an agricultural vehicle such as a truck, a construction vehicle such as an excavator, a construction vehicle, and any other vehicles can be employed as the vehicle 1 in addition to the four-wheeled vehicle. In addition, a drone, an airplane, a robot, and any other devices equipped with a sensor can be employed instead of the vehicle 1.

Further, defects of the sensors $30_i$ include failure of the sensor $30_i$ and any other defects in addition to adherence of dirt (an obstacle that hinders sensing) such as dust, insects and mud. Hereinafter, it is assumed that (adherence of) dirt is employed as a defect of the sensors $30_i$.

In addition, cameras (including a stereo camera), distance measuring sensors (a time of flight (ToF) sensor, a light detection and ranging (LIDAR) sensor, a millimeter wave sensor, and the like), an acceleration sensor, a temperature sensor, and any other sensors can be employed as the sensor $30_i$.

Further, although the five sensor $30_1$ to $30_5$ are mounted on the vehicle 1 in FIG. 1, the number of sensors $30_i$ mounted on the vehicle 1 is not limited to five.

In addition, as a (bidirectional) wireless communication method performed between the vehicle control device 10 and the vehicle exterior terminal 40, for example, any method such as a wireless local area network (LAN) or Bluetooth (registered trademark) can be employed.

Further, wireless communication between the vehicle control device 10 and the vehicle exterior terminal 40 may be performed peer-to-peer or performed via a network such as the Internet.

In addition, the vehicle exterior terminal 40 can be realized as a dedicated terminal or realized by causing a general-purpose information processing device such as a smartphone to execute an application. Further, the vehicle exterior terminal 40 can be configured as a single detachable block of the vehicle control device 10.

<Example of Electrical Configuration of Vehicle 1>

Figure 2:
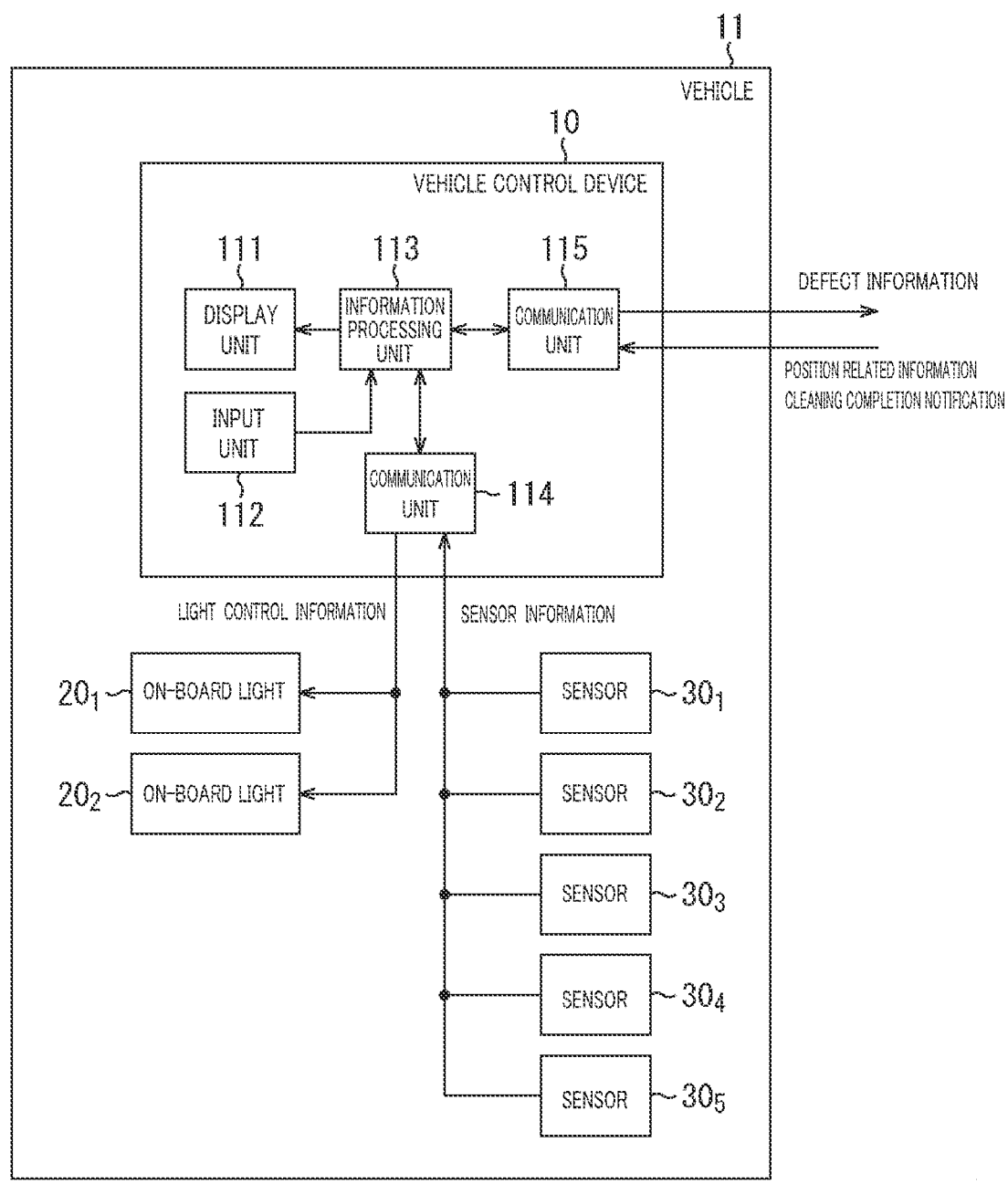
FIG. 2 is a block diagram showing an example of an electrical configuration of a vehicle 1.

FIG. 2 is a block diagram showing an example of an electrical configuration of the vehicle 1 in FIG. 1.

As described in FIG. 1, the vehicle 1 includes the vehicle control device 10, the on-board lights $20_1$ and $20_2$ and the sensors $30_1$ to $30_5$ such as cameras.

The vehicle control device 10 includes a display unit 111, an input unit 112, an information processing unit 113, and communication units 114 and 115.

The display unit 111 displays various types of information according to control of the information processing unit 113.

The input unit 112 is operated by a user and supplies input information corresponding to a user operation to the information processing unit 113. When the input information is supplied from the input unit 112 to the information processing unit 113, the information processing unit 113 performs processing in response to the input information from the input unit 112.

Note that the display unit 111 and the input unit 112 can be integrally configured using a touch panel or the like, for example.

The information processing unit 113 performs control of each block constituting the vehicle control device 10 and various other types of processing.

The communication unit 114 performs wired communication with on-board lights $20_j$, sensors $30_i$, and the like.

For example, the communication unit 114 transmits light control information supplied from the information processing unit 113 to the on-board lights $20_j$. The on-board lights $20_j$ are turned on, blink, are turned off, or change directions and intensities of light emission according to the light control information from the communication unit 114.

In addition, for example, the communication unit 114 receives sensor information transmitted from the sensors $30_i$ and supplies the sensor information to the information processing unit 113. Sensor information of a sensor $30_i$ includes a sensing result of sensing performed by the sensor $30_i$ (e.g., a captured image having pixel values of RGB (red, green and blue) and the like acquired by capturing an image using a camera, a distance image having pixel values of a distance which is acquired by measuring a distance by a distance measuring sensor, or the like), a dirt condition of dirt as a defect of the sensor $30_i$, and the like. The information processing unit 113 detects dirt as a defect of a sensor $30_i$ according to the sensor information of the sensors $30_i$ from the communication unit 114 and generates defect information representing whether the sensor $30_i$ has dirt. Further, the information processing unit 113 introduces sensor position information indicating the position of the sensor $30_i$ (on the vehicle 1) into the defect information of the sensor 30 and supplies the defect information including the sensor position information to the communication unit 115 such that the communication unit 115 transmits the defect information to the vehicle exterior terminal 40.

The communication unit 115 performs wireless communication with the vehicle exterior terminal 40 and the like.

For example, the communication unit 115 transmits the defect information of the sensor $30_i$ supplied from the information processing unit 113 to the vehicle exterior terminal 40.

In addition, for example, the communication unit 115 receives position-related information and a cleaning completion notification transmitted from the vehicle exterior terminal 40 and supplies the position-related information and the cleaning completion notification to the information processing unit 113.

The position-related information transmitted from the vehicle exterior terminal 40 is information about a relative position or direction of the vehicle exterior terminal 40 with respect to the vehicle 1, and the information processing unit 113 obtains the relative position of the vehicle exterior terminal 40 with respect to the vehicle 1 (hereinafter referred to simply as a relative position) from the position-related information. That is, when the position-related information indicates the relative position of the vehicle exterior terminal 40 with respect to the vehicle 1, the information processing unit 113 employs the relative position indicated by the position-related information as the relative position of the vehicle exterior terminal 40. In addition, when the position-related information indicates the relative direction of the vehicle exterior terminal 40 with respect to the vehicle 1, the information processing unit 113 obtains, for example, a position at a predetermined distance from the vehicle 1 in the relative direction indicated by the position-related information as the relative position of the vehicle exterior terminal 40. In addition, the information processing unit 113 controls the on-board lights $20_j$ by supplying light control information for controlling the on-board lights $20_j$ in response to the relative position or the like of the vehicle exterior terminal 40 to the communication unit 114 and causing the communication unit 114 to transmit the light control information to the on-board lights $20_j$.

The cleaning completion notification transmitted from the vehicle exterior terminal 40 is a notification of completion of cleaning of a sensor $30_i$ having dirt, and when the cleaning completion notification is supplied from the communication unit 115, the information processing unit 113 repeats detection of (presence or absence of) dirt as a defect of a sensor $30_i$ according to the sensor information of the sensors $30_i$ from the communication unit 114 and generation of defect information.

<Example of Electrical Configuration of Vehicle Exterior Terminal 40>

Figure 3:
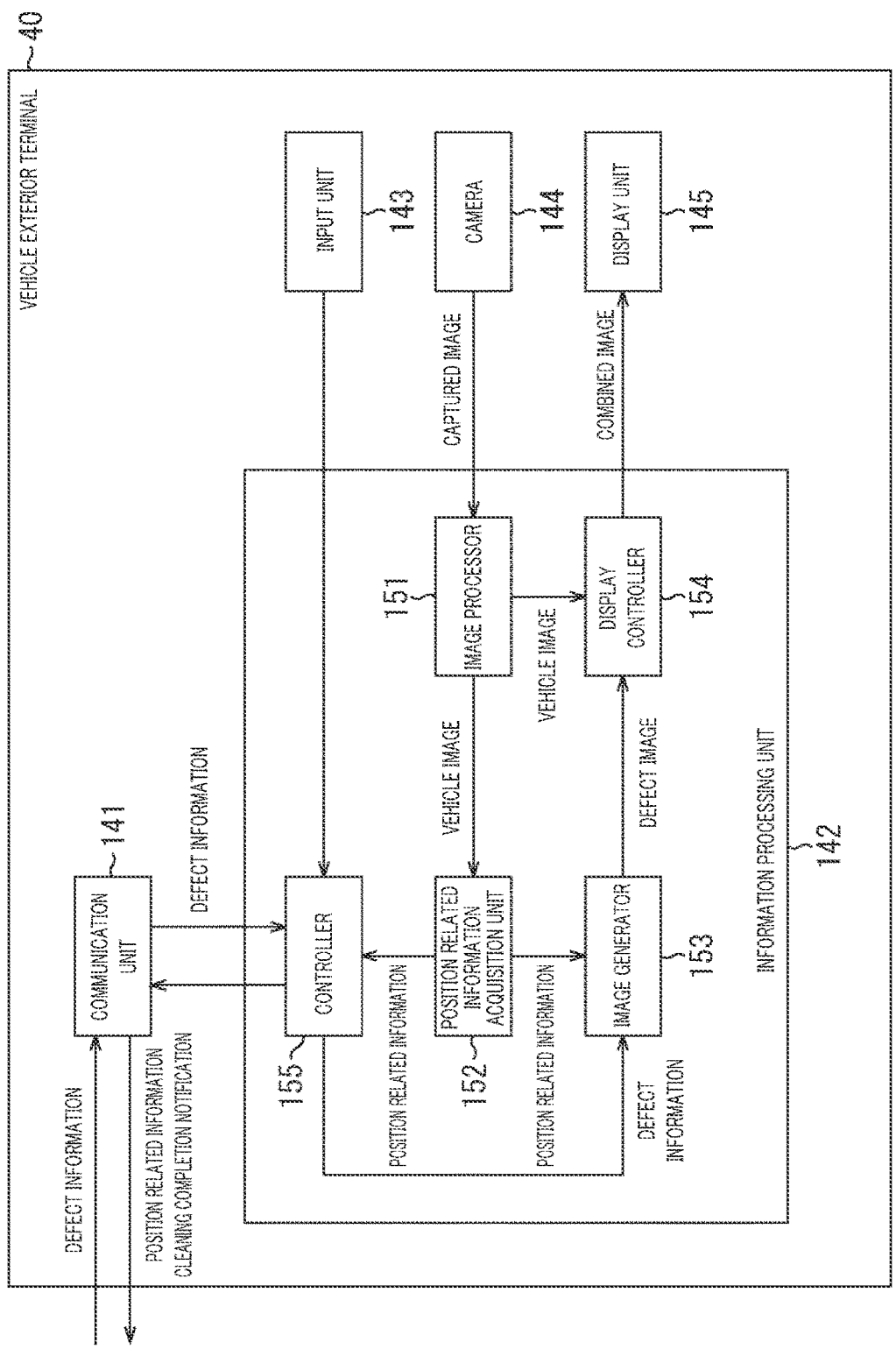
FIG. 3 is a block diagram showing an example of an electrical configuration of a vehicle exterior terminal 40.

FIG. 3 is a block diagram showing an example of an electrical configuration of the vehicle exterior terminal 40 of FIG. 1.

The vehicle exterior terminal 40 includes a communication unit 141, an information processing unit 142, a camera 144, and a display unit 145.

The communication unit 141 performs wireless communication with the vehicle control device 10 and the like.

For example, the communication unit 141 transmits position-related information and a cleaning completion notification supplied from (a controller 155 of) the information processing unit 142 to the vehicle control device 10. In addition, the communication unit 141 receives defect information transmitted from (the communication unit 115 of) the vehicle control device 10 and supplies the defect information to (the controller 155) the information processing unit 142.

The information processing unit 142 performs control of each block constituting the vehicle control device 10 and other various types of processing.

The information processing unit 142 includes an image processor 151, a position-related information acquisition unit 152, an image generator 153, a display controller 154, and the controller 155.

An image captured by the camera 144 is supplied to the image processor 151. When the captured image from the camera 144 is a vehicle image reflecting the vehicle 1, the image processor 151 supplies the captured image that is the vehicle image to the position-related information acquisition unit 152 and supplies it to the display controller 154 as necessary.

In addition, the image processor 151 generates computer graphics (CG) of the vehicle 1 from the captured image that is the vehicle image and provides the vehicle image as the CG to the display controller 154.

The position-related information acquisition unit 152 acquires position-related information about the relative position or direction of the vehicle exterior terminal 40 with respect to the vehicle 1 by estimating the position-related information, for example, according to simultaneous localization and mapping (SLAM) using the captured image that is the vehicle image from the image processor 151 and provides the position-related information to the image generator 153 and the controller 155.

Although the position-related information acquisition unit 152 acquires the position-related information of the vehicle exterior terminal 40 using SLAM in this case, the position-related information of the vehicle exterior terminal 40 can be acquired through any other methods.

For example, the position-related information of the vehicle exterior terminal 40 can be estimated from the shape of the vehicle 1 reflected in the captured image that is the vehicle image. In addition, a predetermined marker can be provided on the vehicle 1 and the position-related information of the vehicle exterior terminal 40 can be estimated from the marker on the vehicle 1 reflected in the captured image that is the vehicle image. Further, radio waves having strong directivity can be transmitted from the vehicle 1 and the position-related information of the vehicle exterior terminal 40 can be estimated from a reception state of the radio waves in the vehicle exterior terminal 40. In addition, when the vehicle 1 and the vehicle exterior terminal 40 have a Global Positioning System (GPS) function, the position-related information of the vehicle exterior terminal 40 can be estimated from positions of the vehicle 1 and the vehicle exterior terminal 40 acquired using the GPS function. Further, when a sensor $30_i$ of the vehicle 1 radiates infrared rays for measuring a distance or the vehicle 1 is equipped with an LED emitting visible rays, the position-related information of the vehicle exterior terminal 40 can be estimated from a reception state of the infrared rays or visible rays in the vehicle exterior terminal 40.

Although methods of obtaining the position-related information in the vehicle exterior terminal 40 have been described above, the position-related information of the vehicle exterior terminal 40 can be obtained in the vehicle 1 instead of the vehicle exterior terminal 40. Then, the position-related information obtained in the vehicle 1 is transmitted from the vehicle 1 to the vehicle exterior terminal 40 and the vehicle exterior terminal 40 can acquire the position-related information by receiving it from the vehicle 1.

In the vehicle 1, position-related information of a user carrying the vehicle exterior terminal 40 outside the vehicle can be obtained as the position-related information of the vehicle exterior terminal 40 by capturing an image of the user using a sensor $30_i$ as a camera and recognizing the user reflected in a captured image acquired by the capturing, for example. In addition, the position-related information of the user can be obtained as the position-related information of the vehicle exterior terminal 40, for example, by employing a human body sensor as a sensor $30_i$ and using a sensing result of the human body sensor. Further, radio waves having strong directivity can be transmitted from the vehicle exterior terminal 40 and the position-related information of the vehicle exterior terminal 40 can be obtained (estimated) from a reception state of the radio waves in the vehicle 1. In addition, when the vehicle exterior terminal 40 can emit infrared rays or visible rays, the position-related information of the vehicle exterior terminal 40 can be obtained from a reception state of the infrared rays or the visible rays in the vehicle 1.

In addition, the position-related information of the vehicle exterior terminal 40 can be obtained by combining a plurality of the above-described methods to improve robustness.

The position-related information of the vehicle exterior terminal 40 is supplied from the position-related information acquisition unit 152 to the image generator 153 and defect information transmitted from the vehicle control device 10 is supplied from the controller 155. The image generator 153 generates a defect image representing the position of a sensor $30_i$ having dirt according to the position-related information from the position-related information acquisition unit 152 and the defect information from the controller 155 and provides the defect image to the display controller 154.

The display controller 154 performs display control for supplying various images to the display unit 145 and causing the display unit 145 to display the images. In addition, the display controller 154 combines the defect image from the image generator 153 with the vehicle image that is a captured image or a CG vehicle image supplied from the image processor 151 to generate a combined image. Then, the display controller 154 provides the combined image to the display unit 145 and causes the display unit 145 to display the combined image.

The controller 155 performs control of each block of the information processing unit 142 and various other types of processing.

For example, the controller 155 generates a cleaning completion notification in response to an operation of the input unit 143, provides the cleaning completion notification to the communication unit 141, and causes the communication unit 141 to transmit the cleaning completion notification. In addition, the controller 155 provides the position-related information supplied from the position-related information acquisition unit 152 to the communication unit 141 and causes the communication unit 141 to transmit the position-related information. Further, the controller 155 provides the defect information supplied from the communication unit 141 and transmitted from the vehicle control device 10 to the image generator 153.

The input unit 143 is operated by a user and provides input information corresponding to a user operation to the controller 155.

The camera 144 captures, for example, an image of a subject such as the vehicle 1 and provides a captured image acquired by the capturing to the image processor 151.

The display unit 145 displays the image such as the combined image supplied from the display controller 154 according to display control of the display controller 154.

Note that the input unit 143 and the display unit 145 can be integrally configured using a touch panel or the like, for example.

In the vehicle control system of FIG. 1 which is composed of the vehicle 1 of FIG. 2 and the vehicle exterior terminal 40 of FIG. 3, notification processing of notifying a user of dirt as a defect of a sensor $30_i$ is started at a predetermined timing in a state in which the vehicle control device 10 of the vehicle 1 starts and the vehicle 1 is stopped in a safe place. As the predetermined timing, for example, a timing at which the user has approached the vehicle 1 (the user has entered a predetermined range of the vehicle 1), a timing at which the user has unlocked the lock (key) of the vehicle 1 from the outside of the vehicle, a timing at which the user has started the engine of the vehicle 1, and the like can be employed.

Note that it is desirable to perform the notification processing in a state in which the engine of the vehicle 1 has been started such that sufficient power can be used in the vehicle control device 10. However, when the vehicle 1 is an electric vehicle, the notification processing may be performed without the engine of the vehicle 1 being started because sufficient power can be used in the vehicle control device 10 even when the engine of the vehicle 1 is not started.

In addition, it is assumed that a combined image and the like are not displayed on the vehicle exterior terminal 40 while the vehicle 1 is traveling because a user who is driving the vehicle 1 cannot view the combined image and the like displayed on the vehicle exterior terminal 40 even if the combined image and the like are displayed on the vehicle exterior terminal 40 while the vehicle 1 is traveling.

When the notification processing is started in the vehicle control device 10 (FIG. 2), the sensor $30_i$ acquires the condition of dirt as a defect of the sensor $30_i$, introduces the condition of dirt into sensor information and transmits the sensor information. The sensor information transmitted by the sensor $30_i$ is received by the communication unit 114 and provided to the information processing unit 113. Note that any method can be employed as a method of acquiring the condition of dirt on the sensor $30_i$. In addition, the condition of dirt of the sensor $30_i$ can be acquired at any timing in addition to the timing at which the notification processing is started. For example, the condition of dirt of the sensor $30_i$ can be acquired and stored in a memory of the vehicle control device 10 or the sensor $30_i$, which is not shown, when the vehicle 1 is traveling, stopped or the like. Then, the condition of dirt of the sensor $30_i$ stored in the memory can be used in the notification processing performed thereafter.

The information processing unit 113 detects the sensor $30_i$ having dirt as a defect (detects the dirt on the sensor $30_i$) from (the condition of dirt included in) the sensor information from the communication unit 114. When the sensor $30_i$ having dirt is detected, the information processing unit 113 causes the display unit 111 to display information representing that the sensor $30_i$ has dirt, and the like. Further, the information processing unit 113 causes the display unit 111 to display the position of the sensor $30_i$ having dirt, the condition (state) of dirt, and the like.

In addition, the information processing unit 113 generates defect information representing whether dirt is present with respect to the sensor $30_i$. Further, the information processing unit 113 introduces sensor position information representing the position of the sensor $30_i$ into the defect information of the sensor $30_i$, provides the defect information to the communication unit 115 and causes the communication unit 115 to transmit the defect information to the vehicle exterior terminal 40.

When a user inside the vehicle 1 views display of the display unit 111 and recognizes that the sensor $30_i$ has dirt, the user cleans the sensor $30_i$ having dirt.

For cleaning of the sensor $30_i$ having dirt, the user exits the vehicle carrying the vehicle exterior terminal 40 and confirms the sensor $30_i$ having dirt according to the vehicle exterior terminal 40. For this, the user exits the vehicle, directs the display unit 145 of the smartphone as the vehicle exterior terminal 40 toward himself or herself and assumes a posture for capturing an image of the vehicle 1 with the camera 144 provided on the opposite side (rear side when the side on which the display unit 145 is provided is a front side) of the display unit 145.

When the notification processing is started in the vehicle exterior terminal 40 (FIG. 3), the camera 144 starts capturing an image.

Accordingly, a captured image that is a vehicle image reflecting the vehicle 1 viewed at the position of the vehicle exterior terminal 40 (the position of the user) is captured by the camera 144 and provided to the image processor 151. The image processor 151 provides the captured image as the vehicle image from the camera 144 to the position-related information acquisition unit 152.

Further, the image processor 151 provides the captured image as the vehicle image from the camera 144 to the display controller 154. Alternatively, the image processor 151 generates CG of the vehicle 1 viewed at the position of the vehicle exterior terminal 40 from the captured image as the vehicle image from the camera 144 and provides the vehicle image as the CG to the display controller 154.

The display controller 154 causes the display unit 145 to display the vehicle image from the image processor 151.

Note that the position-related information acquisition unit 152 acquires position-related information about the relative position or direction of the vehicle exterior terminal 40 with respect to the vehicle 1 by estimating the position-related information using the captured image as the vehicle image from the image processor 151 and provides the position-related information to the image generator 153 and the controller 155. The position-related information provided to the controller 155 is transmitted to the vehicle control device 10 through the communication unit 141 and used for control of the on-board lights $20_j$ and the like as necessary.

In addition, in the vehicle exterior terminal 40 (FIG. 3), the communication unit 141 receives the defect information transmitted from the communication unit 115 of the vehicle control device 10 and provides the defect information to the controller 155. The controller 155 provides the defect information from the communication unit 141 to the image generator 153.

The image generator 153 generates a defect image representing the position of a sensor $30_i$ having dirt according to the position-related information from the position-related information acquisition unit 152 and the defect information from the controller 155 and provides the defect image to the display controller 154.

When the defect image is supplied from the image generator 153, the display controller 154 combines the defect image from the image generator 153 with the vehicle image (captured image or CG) reflecting the vehicle 1 viewed at the position of the vehicle exterior terminal 40 and supplied from the image processor 151 to generate a combined image. Then, the display controller 154 provides the combined image to the display unit 145 and causes the display unit 145 to display the combined image.

Since the combined image is an image obtained by combining the defect image representing the position of the sensor $30_i$ having a defect with the vehicle image reflecting the vehicle 1 viewed at the position of the vehicle exterior terminal 40, that is, the position of the user, the user can easily recognize the position of the sensor $30_i$ having dirt as a defect from among the sensors $30_1$ to $30_5$ mounted on the vehicle 1 by viewing the combined image. That is, the user can recognize the position of the sensor $30_i$ having dirt without returning to the inside of the vehicle in order to view the position of the sensor $30_i$ having dirt displayed on the display unit 111 of the vehicle control device 10 by viewing the combined image displayed on the display unit 145 of the vehicle exterior terminal 40. As a result, user convenience can be improved.

Upon recognition of the position of the sensor $30_i$ having dirt, the user approaches and cleans the sensor $30_i$. Upon completion of cleaning of the sensor $30_i$, the user operates the input unit 143 to provide a cleaning completion notification. The controller 155 causes the communication unit 141 to transmit the cleaning completion notification in response to the operation of the input unit 143.

The cleaning completion notification transmitted from the communication unit 141 is received by the communication unit 115 of the vehicle control device 10 and provided to the information processing unit 113. The information processing unit 113 detects a sensor $30_i$ having dirt as a defect again from sensor information from the communication unit 114 in response to the cleaning completion notification.

Then, when a sensor $30_i$ having dirt is detected, the same processing as that in the above-described case is repeated.

Meanwhile, when a sensor $30_i$ having dirt is not detected, notification processing of the vehicle control device 10 and the vehicle exterior terminal 40 ends.

Note that, although the input unit 143 of the vehicle exterior terminal 40 is operated in order to notify the information processing unit 113 of the vehicle control device 10 of the cleaning completion notification in this case, it is possible to notify the information processing unit 113 of the cleaning completion notification by operating the input unit 112 of the vehicle control device 10.

In addition, the display controller 154 can generate a combined image obtained by combining the defect image with a bird's eye view image overlooking the vehicle 1 in addition to the combined image obtained by combining the defect image with the vehicle image reflecting the vehicle 1 viewed at the position of the vehicle exterior terminal 40 and cause the display unit 145 to display the combined image.

<Example of Display of Combined Image>

Figure 4:
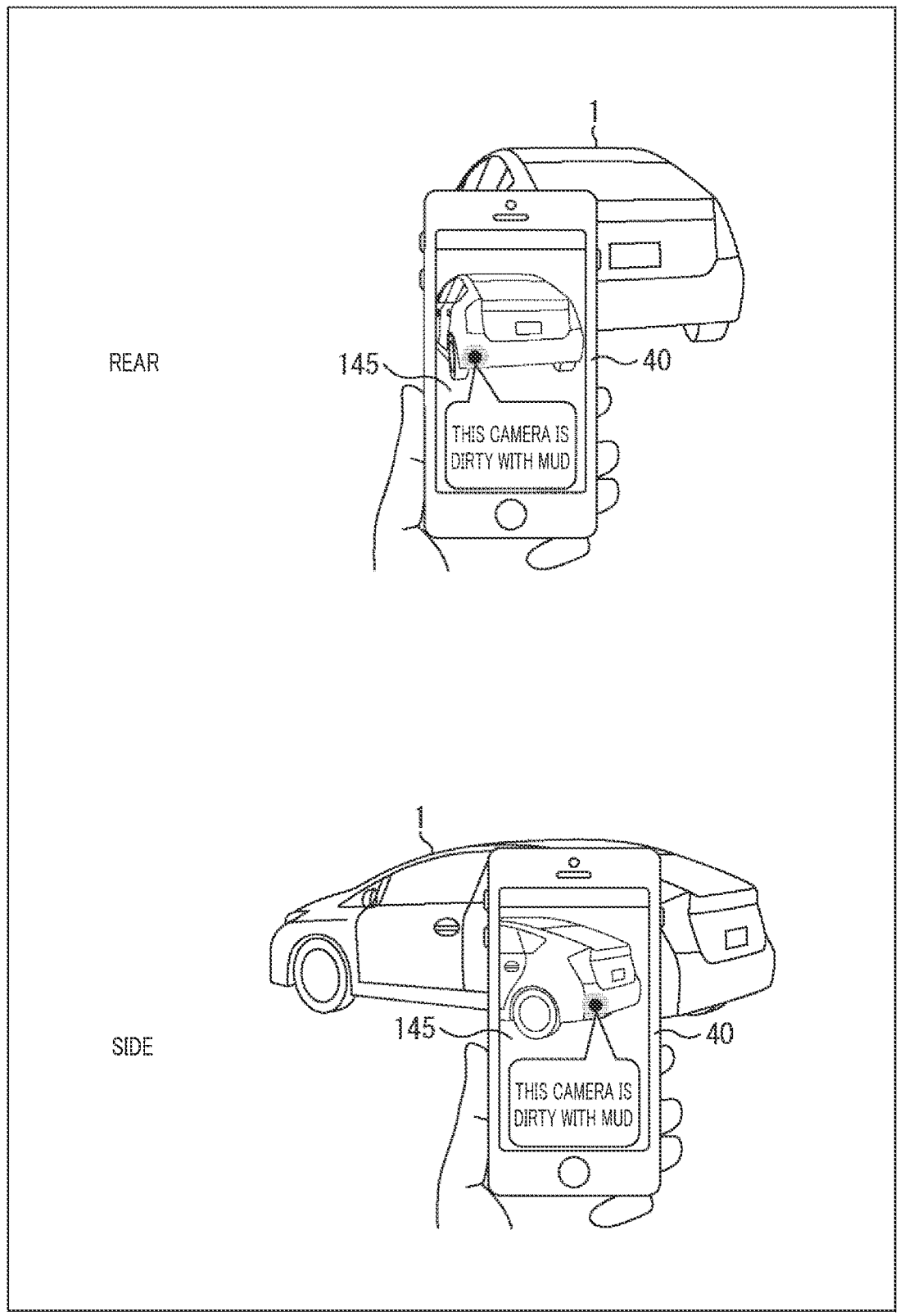
FIG. 4 is a diagram illustrating augmented reality (AR) display as a first display example of a combined image.

FIG. 4 is a diagram illustrating augmented reality (AR) display as a first display example of a combined image.

In AR display, a combined image obtained by combining a defect image with a captured image as a vehicle image obtained by capturing an image of the vehicle 1 using the camera 144 at the position of the vehicle exterior terminal 40 is displayed.

In FIG. 4, a circular image representing the position of a sensor $30_i$ having dirt on the vehicle 1 and a balloon image in which a message "This camera is dirty with mud" is written are used as a defect image, and a combined image obtained by combining the defect image with a captured image that is a vehicle image is displayed on the display unit 145.

Note that FIG. 4 shows combined images displayed on the display unit 145 in a case where a user carrying the vehicle exterior terminal 40 is located behind the vehicle 1 and a case where the user is located slightly behind the vehicle 1 on the left (facing the front side).

According to AR display, the user can easily recognize the position of the sensor $30_i$ having dirt because the vehicle image of the vehicle 1 viewed at the position of (the vehicle exterior terminal 40 carried by) the user and the defect image representing the position of the sensor $30_i$ having dirt are displayed.

Figure 5:
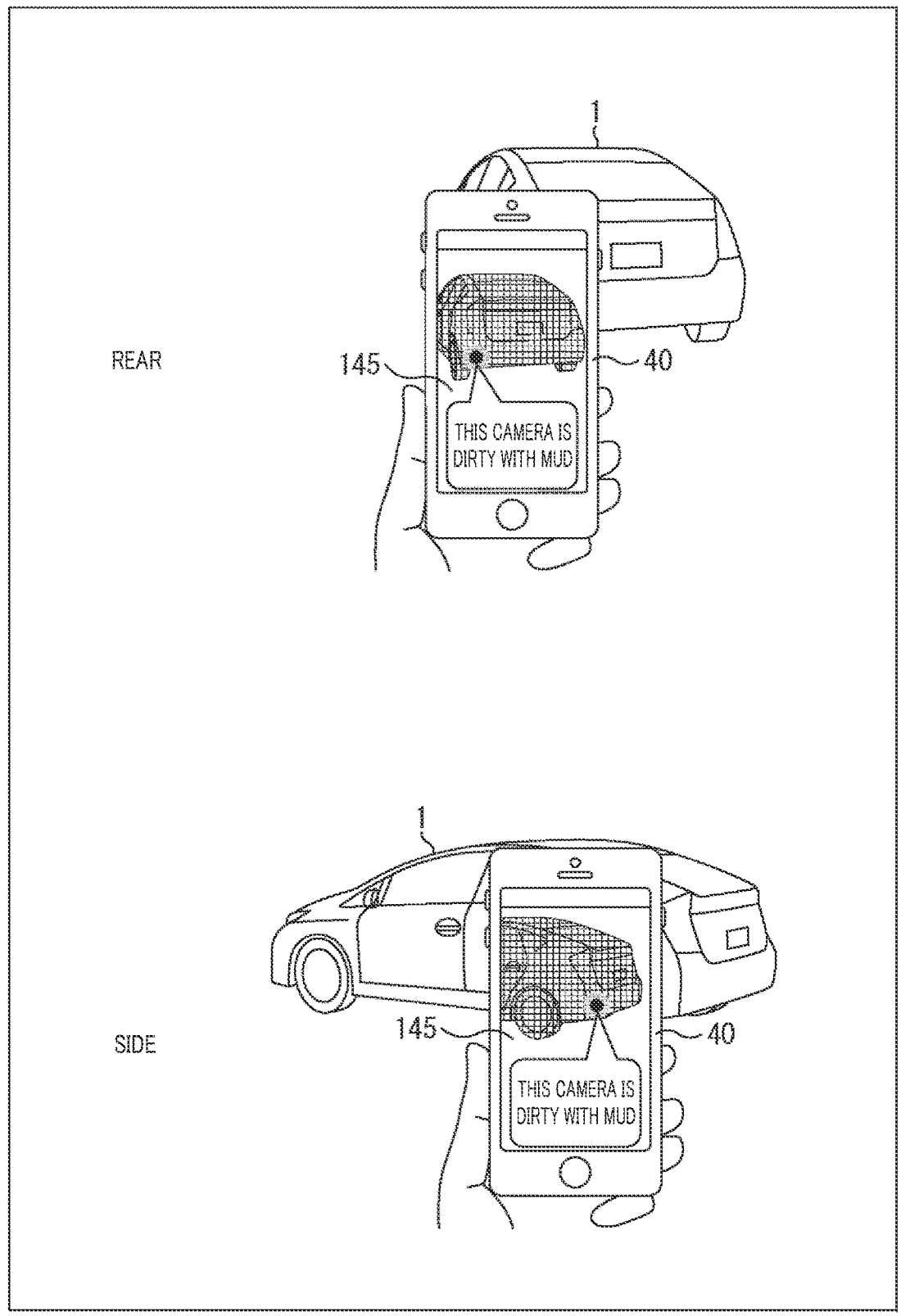
FIG. 5 is a diagram illustrating virtual reality (VR) display as a second display example of a combined image.

FIG. 5 is a diagram illustrating virtual reality (VR) display as a second display example of a combined image.

In VR display, a combined image obtained by combining a defect image with CG as a vehicle image reflecting the vehicle 1 viewed at the position of the vehicle exterior terminal 40, generated from a vehicle image obtained by capturing an image of the vehicle 1 using the camera 144 at the position of the vehicle exterior terminal 40 using a three-dimensional (3D) model or the like, is displayed.

In FIG. 5, a circular image representing the position of a sensor $30_i$ having dirt on the vehicle 1 and a balloon image in which a message "This camera is dirty with mud" is written are used as a defect image, and a combined image obtained by combining the defect image with CG as a vehicle image is displayed on the display unit 145.

Note that FIG. 5 shows combined images displayed on the display unit 145 in a case where a user carrying the vehicle exterior terminal 40 is located behind the vehicle 1 and a case where the user is located slightly behind the vehicle 1 on the left as in the case of FIG. 4.

According to VR display, the user can easily recognize the position of the sensor $30_i$ having dirt because the vehicle image of the vehicle 1 viewed at the position of (the vehicle exterior terminal 40 carried by) the user and the defect image representing the position of the sensor $30_i$ having dirt are displayed, as in AR display.

Here, AR display and VR display share a feature in that a combined image obtained by combining a defect image with a vehicle image of the vehicle 1 viewed at the position of the vehicle exterior terminal 40 is displayed. However, AR display differs from VR display in that a vehicle image of AR display is an image captured using the camera 144 whereas a vehicle image of VR display is CG.

Figure 6:
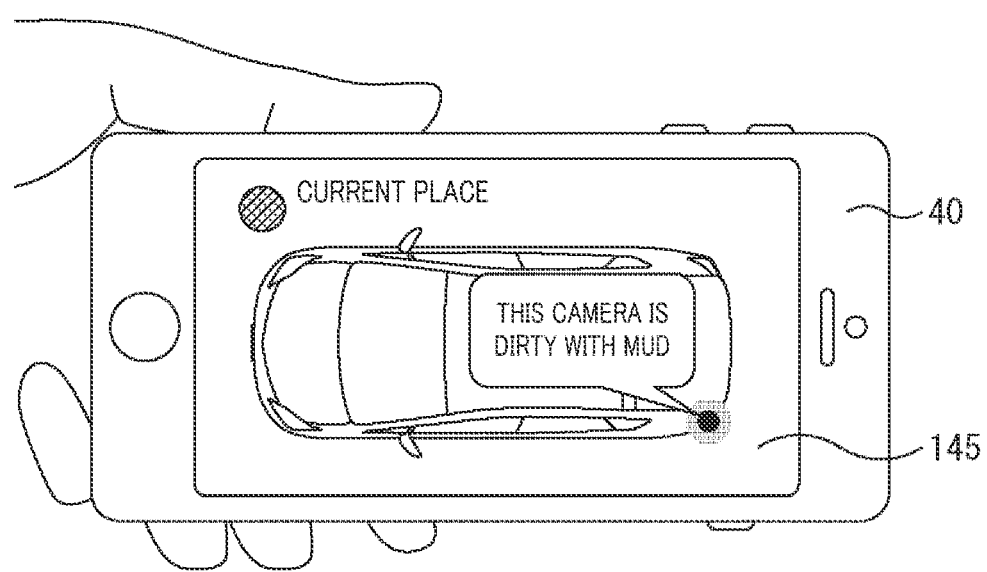
FIG. 6 is a diagram illustrating bird's eye view display as a third display example of a combined image.

FIG. 6 is a diagram illustrating bird's eye view display as a third display example of a combined image.

In bird's eye view display, a combined image obtained by combining a defect image and a relative position image representing a relative position of the vehicle exterior terminal 40 with a vehicle image (hereinafter referred to as a bird's eye view image) overlooking the vehicle 1 is displayed.

In FIG. 6, a circular image representing the position of a sensor $30_i$ having dirt on the vehicle 1 and a balloon image in which a message "This camera is dirty with mud" is written are used as a defect image, a circular image representing a relative position of the vehicle exterior terminal 40 and a message "Current place" representing that the relative position is the position of a user are used as a relative position image, and a combined image obtained by combining the defect image and the relative position image with a bird's view image is displayed on the display unit 145.

As a bird's eye view image, for example, an image overlooking the vehicle 1, or the like for a parking assistance system can be used.

According to bird's eye view display, the user can easily recognize the position of the sensor $30_i$ having dirt because the bird's eye view image overlooking the vehicle 1, the defect image representing the position of the sensor $30_i$ having dirt, and the relative position image representing the relative position (current place) of (the vehicle exterior terminal 40 carried by) the user are displayed.

The above-described AR display, VR display and bird's eye view display can be switched as necessary.

For example, AR display, VR display and bird's eye view display can be switched in response to a user operation.

In addition, switching of AR display, VR display and bird's eye view display can be performed as follows.

For example, the vehicle exterior terminal 40 can perform bird's eye view display when a sensor $30_i$ having dirt is not viewed at the position of a user, that is, the position of the vehicle exterior terminal 40.

In addition, the vehicle exterior terminal 40 can perform AR display or VR display when the sensor $30_i$ having dirt is viewed at the position of the vehicle exterior terminal 40.

In this case, the user can be induced to move to the position at which the sensor $30_i$ having dirt is viewed according to bird's eye view display when the sensor $30_i$ having dirt is not viewed at the position of the vehicle exterior terminal 40. Then, the user can easily recognize the position of the sensor $30_i$ having dirt according to AR display or VR display after moving to the position at which the sensor $30_i$ having dirt is viewed.

In addition, the vehicle exterior terminal 40 can perform AR display or VR display, for example, in response to brightness of a vehicle image captured using the camera 144. For example, AR display can be performed when a luminance average value of the vehicle image is equal to or greater than a threshold value and VR display can be performed when the luminance average value of the vehicle image is not equal to or greater than the threshold value.

For example, there are cases in which the vehicle image captured using the camera 144 is dark and thus it is difficult to visually recognize the vehicle 1 reflected in the vehicle image at night. In this case, in a combined image obtained by combining a defect image with the vehicle image, it is also difficult to visually recognize the vehicle 1 reflected in the combined image.

Accordingly, when the vehicle image captured using the camera 144 is dark and, for example, a luminance average value of the vehicle image is not equal to or greater than a threshold value, it is possible to prevent the vehicle 1 reflected in the combined image from having difficulty being visually recognized by performing VR display for displaying CG of the vehicle 1.

Note that although the brightness of the vehicle image captured using the camera 144 (whether the vehicle image is dark) is determined using the luminance average value of the vehicle image here, the brightness of the vehicle image captured using the camera 144 can be determined, for example, using illuminance measured using an illuminometer in addition thereto.

In addition, as a defect image used to generate a combined image, any graphical user interface (GUI) that displays the position of a sensor $30_i$ having dirt such that the position is easily recognized can be employed in addition to the above-described image representing the position of the sensor $30_i$ having dirt.

<Control of Equipment of Vehicle 1 Synchronized with Notification Processing>

Figure 7:
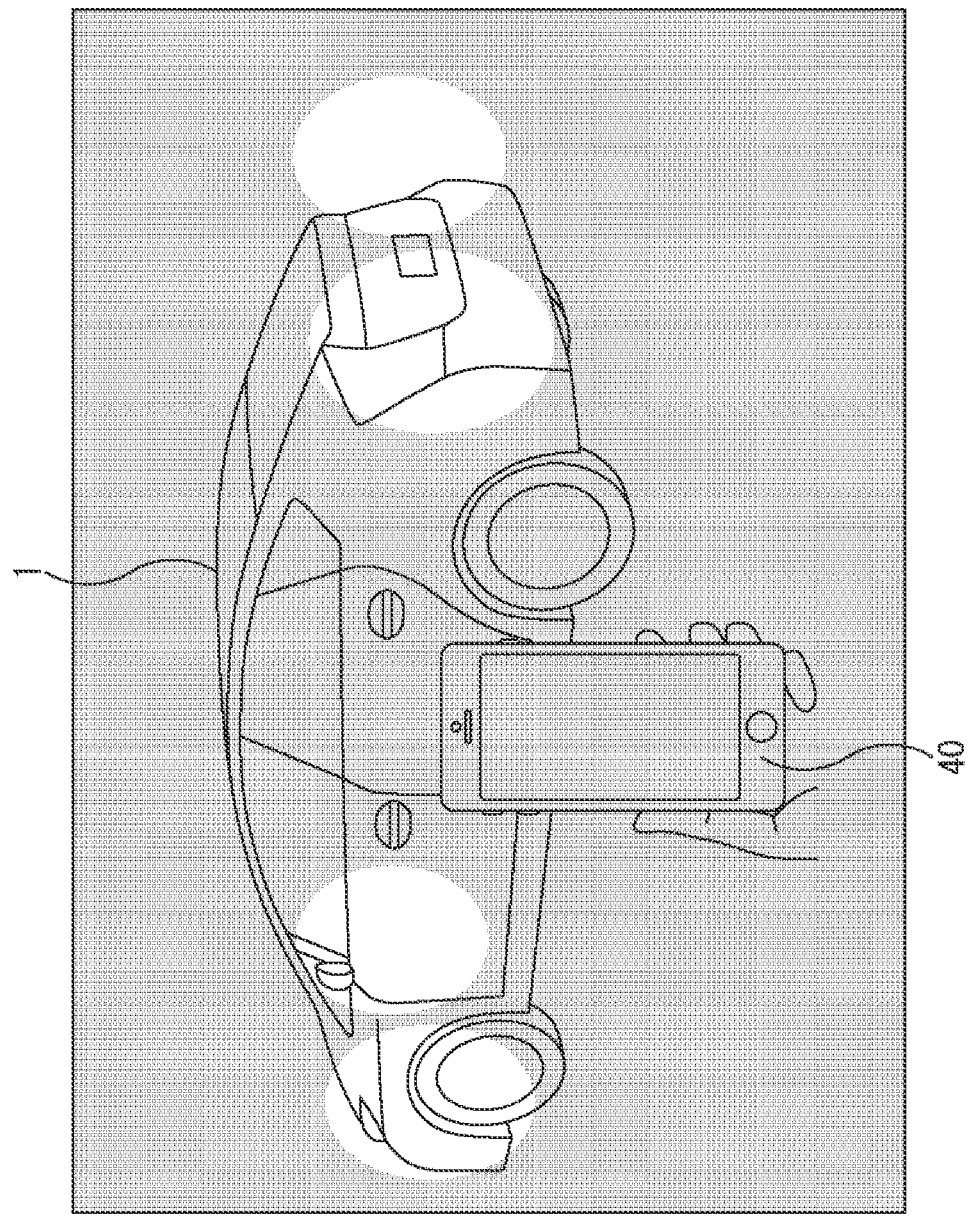
FIG. 7 is a diagram illustrating an example of control of equipment of the vehicle 1 synchronized with notification processing.

FIG. 7 is a diagram illustrating an example of control of equipment of the vehicle 1 synchronized with notification processing.

The vehicle control device 10 can control equipment of the vehicle 1 in order to assist a user in easily recognize the position of a sensor $30_i$ having dirt in synchronization with execution of notification processing (in parallel to notification processing).

When it is assumed that control of equipment of the vehicle 1 performed by the vehicle control device 10 in order to assist the user in easily recognizing the position of a sensor $30_i$ having dirt is referred to as assistant control, the vehicle control device 10 can perform assistant control in response to position-related information of the vehicle exterior terminal 40, surrounding brightness, and the like transmitted from the vehicle exterior terminal 40.

For example, in the vehicle control device 10, the information processing unit 113 can control on-board lights $20_j$ close to a sensor $30_i$ having dirt (on-board lights $20_j$ around the sensor $30_i$ having dirt) through the communication unit 114 such that the on-board lights $20_j$ are turned on with predetermined brightness when surrounding brightness is low in response to the surrounding brightness, as shown in FIG. 7. In this case, since the on-board lights $20_j$ close to the sensor $30_i$ having dirt are turned on at night, for example, it is possible to assist the user in finding the sensor $30_i$ having dirt and performing an operation of cleaning the sensor $30_i$ having dirt.

In addition, in the vehicle control device 10, the position-related information of the vehicle exterior terminal 40 transmitted from the vehicle exterior terminal 40 is received by the communication unit 115 and provided to the information processing unit 113. In the information processing unit 113, the relative position of the vehicle exterior terminal 40 is obtained from the position-related information from the communication unit 115. The information processing unit 113 can determine whether the sensor $30_i$ having dirt is viewed at the position of the vehicle exterior terminal 40, that is, the position of the user, using the relative position of the vehicle exterior terminal 40. In addition, the information processing unit 113 can control the on-board lights $20_j$ close to the sensor $30_i$ having dirt such that the on-board lights $20_j$ are turned on, as described above, when the surrounding brightness is low and the sensor $30_i$ having dirt is viewed at the position of the vehicle exterior terminal 40.

Note that it is possible to determine whether the surroundings are dark according to the brightness (luminance) of an image captured using the camera 144, illuminance measured using an illuminometer, or the like.

In addition, the information processing unit 113 can control the on-board lights $20_j$ such that the on-board lights $20_j$ blink or are turned on in response to the relative position of the vehicle exterior terminal 40.

For example, when (the vehicle exterior terminal 40 carried by) the user is separated from the sensor $30_i$ having dirt, the information processing unit 113 can control the on-board lights $20_j$ close to the sensor $30_i$ having dirt such that the on-board lights $20_j$ blink. In this case, the user can recognize an approximate position of the sensor $30_i$ having dirt according to the blinking on-board lights $20_j$.

In addition, when the user is located close to the sensor $30_i$ having dirt, the information processing unit 113 can control the on-board lights $20_j$ close to the sensor $30_i$ having dirt such that the on-board lights $20_j$ are turned on with relatively high light intensity. In this case, since the proximity of the sensor $30_i$ having dirt is brightly illuminated when the user who has recognized an approximate position of the sensor $30_i$ having dirt approaches the sensor $30_i$ having dirt, for example, it is possible to assist the user in checking a degree of dirt of the sensor $30_i$ having dirt and performing an operation of cleaning the sensor $30_i$ at night.

Note that when the information processing unit 113 has caused the on-board lights $20_j$ to be turned on or to blink, the information processing unit 113 can cause the on-board lights $20_j$ to be turned off in response to a user operation or the like, or by waiting a cleaning completion notification.

<Notification Processing>

Figure 8:
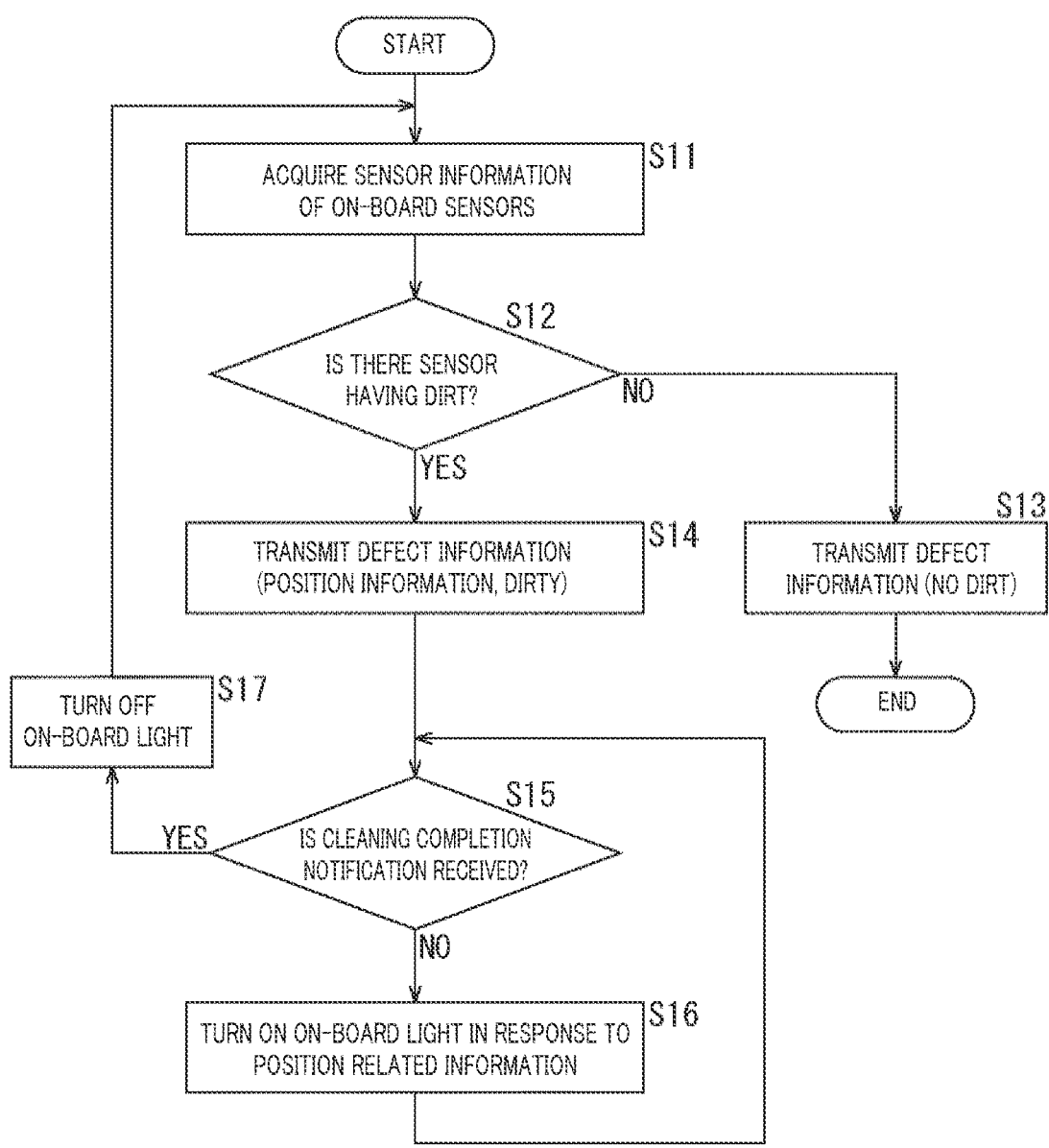
FIG. 8 is a flowchart illustrating notification processing of a vehicle control device 10.

FIG. 8 is a flowchart illustrating notification processing of the vehicle control device 10 of FIG. 2.

In step S11, the information processing unit 113 of the vehicle control device 10 acquires sensor information of sensors $30_i$ from the respective sensors $30_i$ through the communication unit 114, and processing proceeds to step S12.

In step S12, the information processing unit 113 determines whether there is a sensors $30_i$ having dirt using the sensor information of each sensors $30_i$. Here, the information processing unit 113 which performs processing of step S12 can be said to serve as a defect detector which detects dirt as a defect of the sensors $30_i$.

When it is determined that there are no sensors $30_i$ having dirt in step S12, processing proceeds to step S13, the information processing unit 113 generates defect information representing that there is no dirt as a defect and causes the communication unit 115 to transmit the defect information to the vehicle exterior terminal 40, and notification processing of the vehicle control device 10 ends.

Meanwhile, when it is determined that there is a sensors $30_i$ having dirt in step S12, processing proceeds to step S14 and the information processing unit 113 generates defect information representing that there is dirt as a defect. Further, the information processing unit 113 introduces sensor position information representing the position of the sensors $30_i$ having dirt into the defect information and causes the communication unit 115 to transmit the defect information including the sensor position information to the vehicle exterior terminal 40, and processing proceeds to step S15 from step S14.

In step S15, the information processing unit 113 determines whether a cleaning completion notification has been received from the vehicle exterior terminal 40.

When it is determined that the cleaning completion notification has not been received in step S15, processing proceeds to step S16 and the information processing unit 113 controls on-board lights $20_j$ through the communication unit 114 in response to position-related information of the vehicle exterior terminal 40, or the like, for example, such that on-board lights $20_j$ close to the sensors $30_i$ having dirt are turned on as necessary. Then, processing returns from step S16 to step S15 and the same processing is repeated.

In addition, when it is determined that the cleaning completion notification has been received in step S15, that is, when the user cleans the sensors $30_i$ having dirt and then operates the vehicle exterior terminal 40 such that the cleaning completion notification is performed to cause the cleaning completion notification to be transmitted from the vehicle exterior terminal 40 to the vehicle control device 10, processing proceeds to step S17.

In step S17, the information processing unit 113 controls the on-board lights $20_j$ through the communication unit 114 such that the on-board lights $20_j$ are turned off when the on-board lights $20_j$ have been turned on in step S16, and processing returns to step S11. Accordingly, when (it is supposed, just in a case, that) the user has cleaned the sensors $30_i$ having dirt to eliminate the dirt as a defect, the on-board lights $20_j$ being turned on are turned off.

Then, the information processing unit 113 acquires sensor information of each sensors $30_i$ in step S11, as described above, and the same processing is repeated until it is determined that there are no sensors $30_i$ having dirt in step S12.

Figure 9:
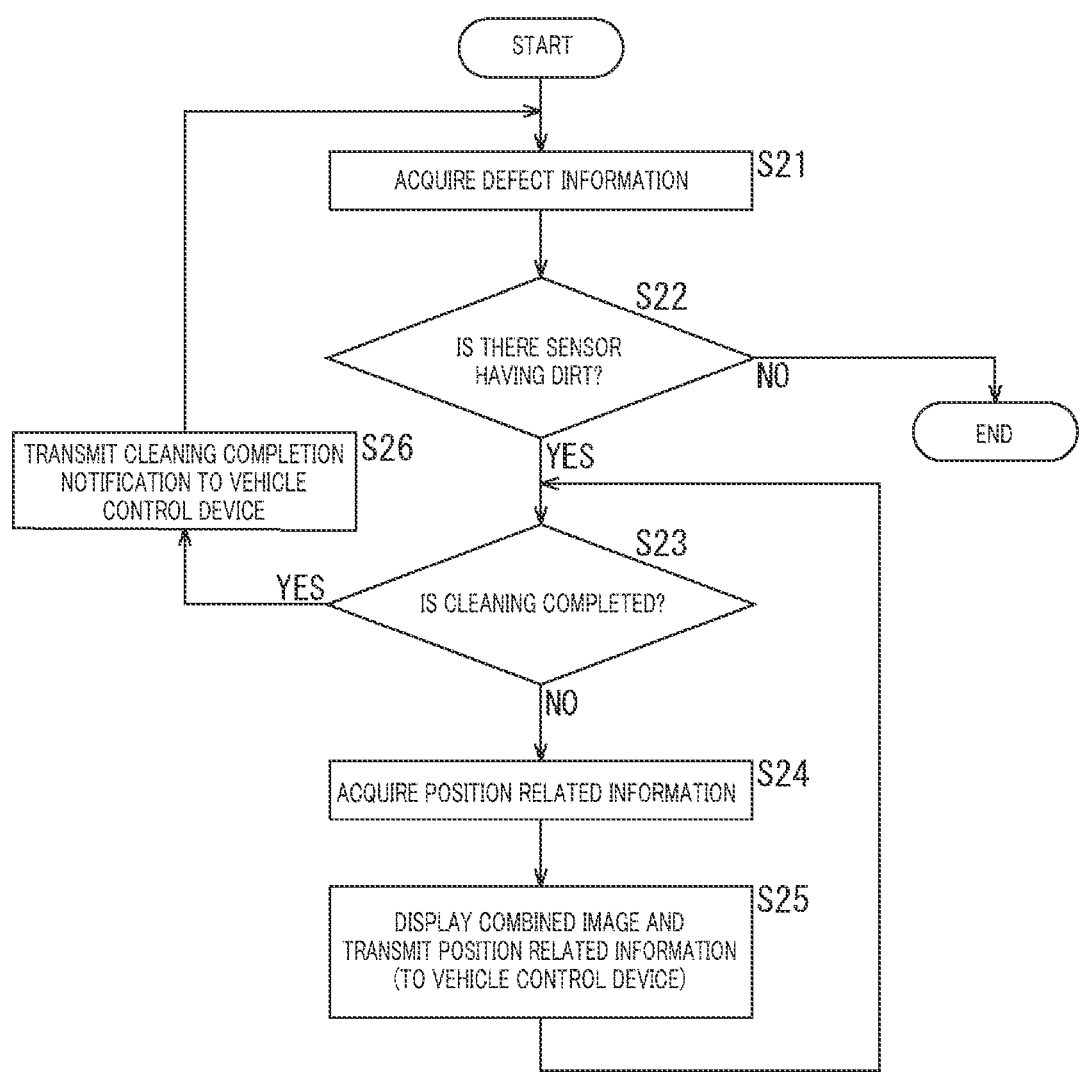
FIG. 9 is a flowchart illustrating notification processing of the vehicle exterior terminal 40.

FIG. 9 is a flowchart illustrating notification processing of the vehicle exterior terminal 40 of FIG. 3.

In step S21, the controller 155 of the vehicle exterior terminal 40 acquires defect information from the vehicle control device 10, and processing proceeds to step S22.

That is, the communication unit 141 waits for transmission of the defect information from the vehicle control device 10, receives the defect information and provides the defect information to the controller 155. The controller 155 acquires the defect information supplied from the communication unit 141 in this manner.

In step S22, the controller 155 determines whether there is a sensor $30_i$ having dirt using the defect information from the vehicle control device 10 acquired in step S21.

When it is determined that there is a sensor 30 having dirt in step S22, that is, when the defect information from the vehicle control device 10 represents that there is dirt and includes sensor position information of the sensor $30_i$ having dirt, the controller 155 provides the defect information from the vehicle control device 10 to the image generator 153, and processing proceeds to step S23.

In step S23, the controller 155 determines whether the input unit 143 is operated to notify a cleaning completion notification.

When it is determined that the input unit 143 is not operated to notify the cleaning completion notification in step S23, processing proceeds to step S24 in which the position-related information acquisition unit 152 acquires position-related information of the vehicle exterior terminal 40 and provides the position-related information to the controller 155 and the image generator 153, and processing proceeds to step S25.

In step S25, the image generator 153 generates a defect image representing the position of the sensor $30_i$ having dirt in response to the position-related information from the position-related information acquisition unit 152 and the defect information from the controller 155 and provides the defect image to the display controller 154.

The display controller 154 combines the defect image from the image generator 153 with a vehicle image supplied from the image processor 151 or a vehicle image overlooking the vehicle 1 to generate a combined image. Then, the display controller 154 provides the combined image to the display unit 145 and causes the display unit 145 to display the combined image.

In addition, the controller 155 causes the position-related information from the position-related information acquisition unit 152 to be transmitted from the communication unit 141 to the vehicle control device 10, and processing returns to step S23 from step S25.

Here, as described above, the position-related information transmitted from the communication unit 141 to the vehicle control device 10 is used for processing of step S16 of FIG. 8.

Meanwhile, when it is determined that the input unit 143 is operated to notify the cleaning completion notification in step S23, processing proceeds to step S26 in which the controller 155 causes the cleaning completion notification to be transmitted from the communication unit 141 to the vehicle control device 10, and processing returns to step S21.

In step S21, the defect information from the vehicle control device 10 is acquired, as described above, and processing proceeds to step S22.

In addition, when it is determined that there is no sensor $30_i$ having dirt in step S22, that is, when the defect information from the vehicle control device 10 represents that there is no dirt, notification processing of the vehicle exterior terminal 40 ends.

<Display of Defect Image Including Image Representing Position of Dirt>

Figure 10:
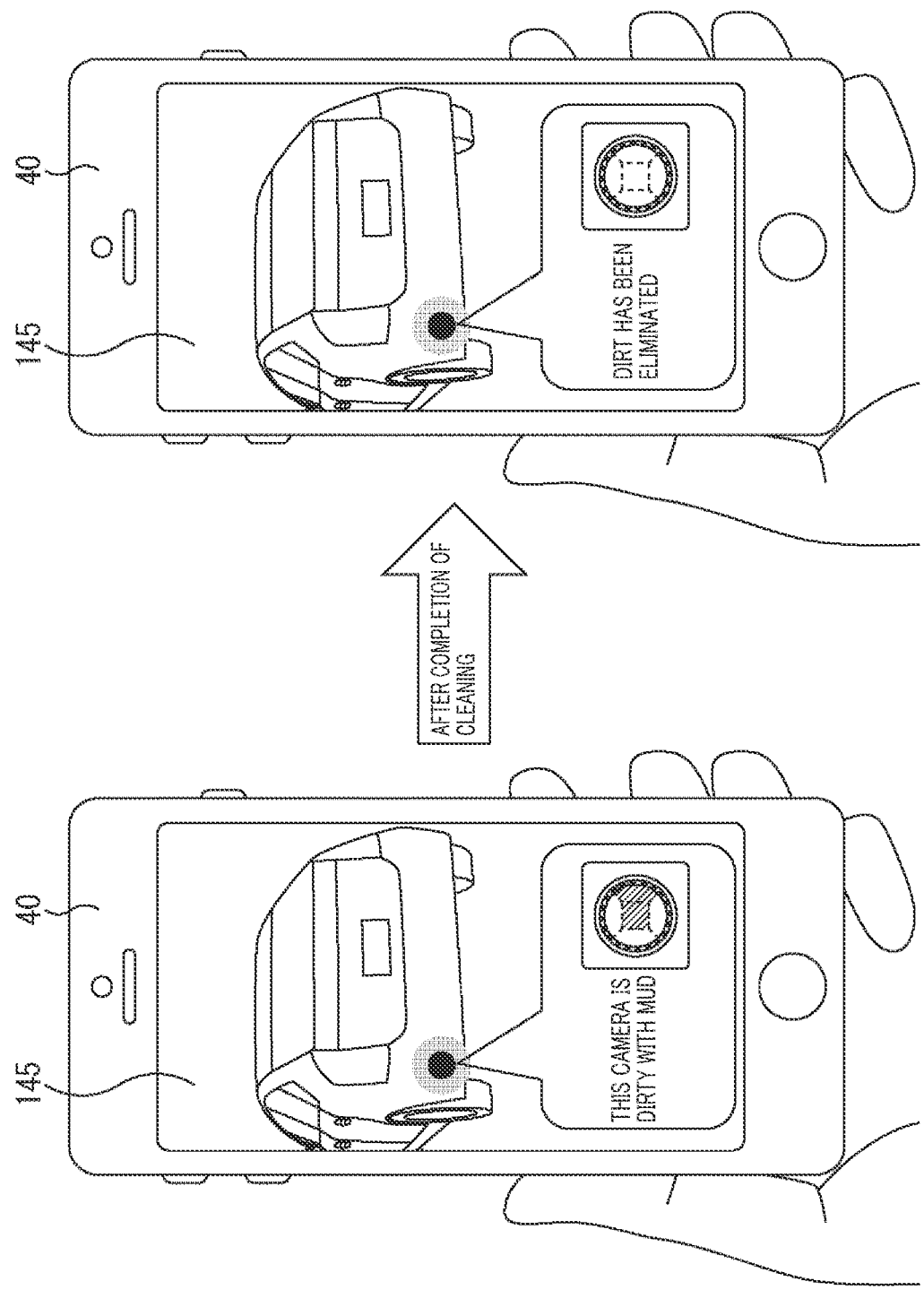
FIG. 10 is a diagram showing a display example of display of a defect image including an image representing a position of dirt.

FIG. 10 is a diagram showing a display example of display of a defect image including an image representing a position of dirt.

For example, in a case where a sensor $30_i$ is a relatively large camera, when a part of the lens of the camera as the sensor $30_i$ is dirty and the vehicle control device 10 can detect the position of the dirt (on the lens), defect information can include dirt position information representing the position (range) of the dirt on the camera as the sensor $30_i$.

In this case, the image generator 153 of the vehicle exterior terminal 40 (FIG. 3) can generate a defect image including an image representing the position of the dirt on the sensor $30_i$ having dirt.

FIG. 10 shows a display example of a combined image obtained by combining the defect image including the image representing the position of the dirt on the sensor $30_i$ having dirt with a vehicle image of the vehicle 1 viewed at the position of the vehicle exterior terminal 40.

In FIG. 10, a circular image representing the position of the sensor $30_i$ having dirt and a balloon image in which a message "This camera is dirty with mud" is written are displayed as a defect image. Further, an image in which a shadow as the dirt is added to an image rendering the camera as the sensor $30_i$ having dirt is used as a dirt position image representing the position of the dirt and the defect image including the dirt position image is displayed in FIG. 10.

As described above, when the dirt position image is displayed, the user can easily recognize a dirty position on the sensor $30_i$ having dirt.

Note that the position of the dirt in the dirt position image can be displayed, for example, by changing colors of the image, blinking the image, or the like.

In addition, when the user cleans the sensor $30_i$ having dirt so that the dirt is removed, display of the defect image in the vehicle exterior terminal 40 can be changed to display of an image representing that the dirt has been removed.

In FIG. 10, a circular image representing the position of the sensor $30_i$ having dirt and a balloon image in which a message "Dirt has been eliminated" is written are displayed as an image representing that the dirt has been removed. Further, an image rendering the camera as the sensor $30_i$ without dirt is displayed as an image representing that dirt has been removed in FIG. 10.

<Example of Configuration of Sensor $30_i$ Having Light-Emitting Parts>

Figure 11:
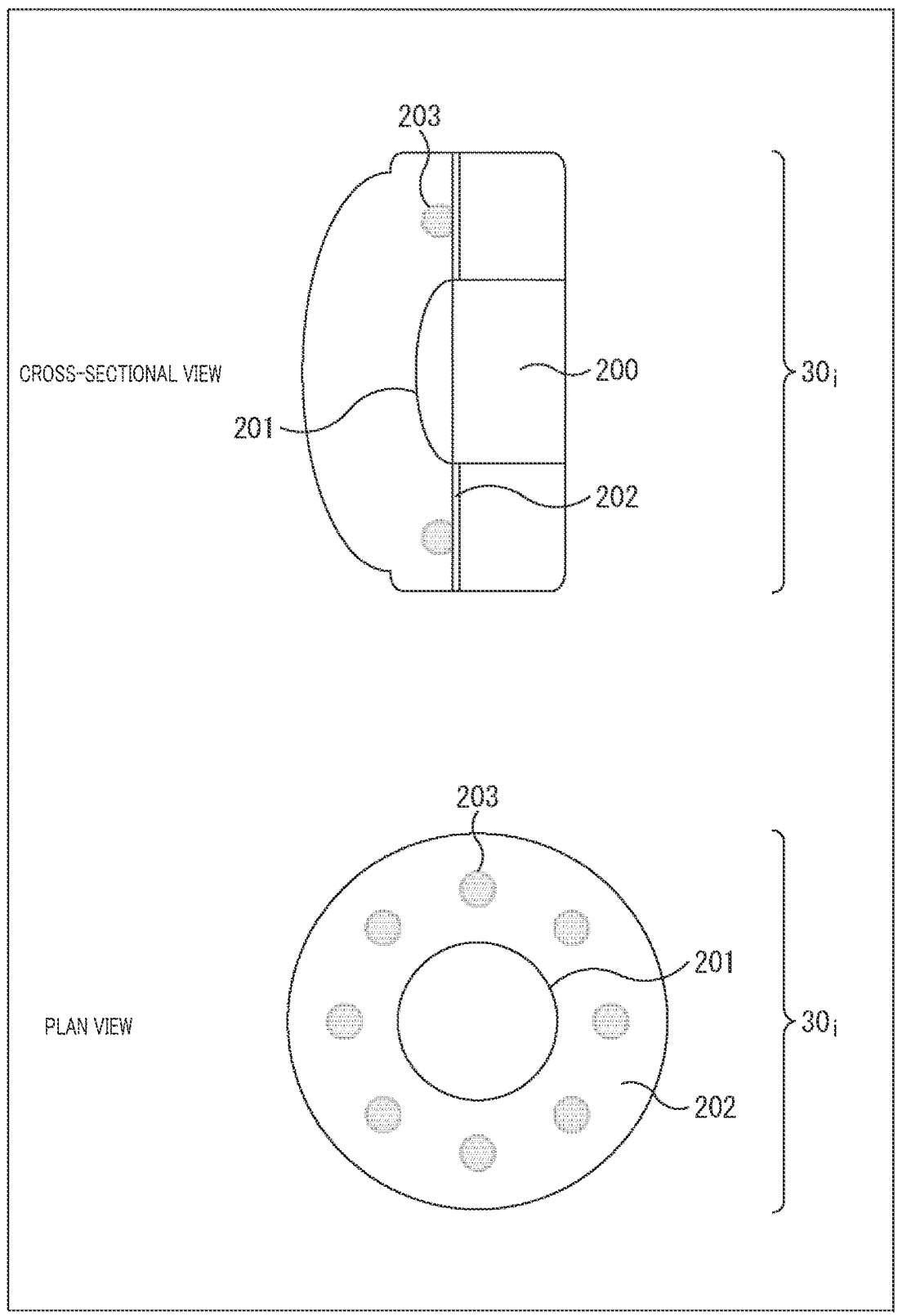
FIG. 11 is a cross-sectional view and a plan view showing an example of a configuration of a sensor $30_i$ having light-emitting parts.

FIG. 11 is a cross-sectional view and a plan view showing an example of a configuration of a sensor $30_1$ having light-emitting parts.

In the vehicle 1, provision of on-board lights $20_j$ is not limited to positions around (positions close to) sensors $30_i$. When the on-board lights $20_j$ are not provided at positions around sensors $30_i$, there are cases in which an on-board light $20_j$ far away from a sensor $30_i$ having dirt is turned on even when an on-board light $20_j$ closest to the sensor $30_i$ having dirt is turned on as described in FIG. 7. Turning on of the on-board light $20_j$ far away from the sensor $30_i$ having dirt in this manner hinders the user from easily recognizing the position of the sensor $30_i$ having dirt rather than assisting the user in easily recognizing the position of the sensor $30_i$ having dirt.

Accordingly, it is possible to employ sensors $30_i$ having light-emitting parts as sensors $30_i$ mounted on the vehicle 1.

In FIG. 11, a sensor $30_i$ is a camera, for example, and includes an optical sensor 200 configured as an image sensor or the like. A lens 201 is provided on the side of a light-receiving face of the optical sensor 200. Further, an annular substrate 202 is provided around the optical sensor 200 and a plurality of light-emitting parts 203 are provided on the annular substrate 202 such that they surround the optical sensor 200 (the lens 201).

Here, the light-emitting parts 203 can be configured as LEDs or the like. In addition, although 8 light-emitting parts 203 are provided in FIG. 11, the number of light-emitting parts 203 provided in the sensor $30_i$ may be 1 or a multiple number other than 8.

As described above, when the sensors $30_i$ include the light-emitting parts 203, it is possible to cause the light-emitting parts 203 included in a sensor $30_i$ having dirt to be turned on or blink instead of the on-board lights $20_j$. When the light-emitting parts 203 included in the sensor $30_i$ having dirt are caused to be turned on or blink, the user can easily recognize the correct position of the sensor $30_i$ having dirt as compared to a case in which on-board lights $20_j$ around the sensor $30_i$ having dirt are caused to be turned on or blink.

Note that a defect image and a combined image can be generated in the vehicle control device 10 or a computer on a cloud instead of the vehicle exterior terminal 40 and provided to the vehicle exterior terminal 40.

<Description of Computer to which Present Technology is Applied>

Next, a series of processing of the above-described vehicle control device 10 and the vehicle exterior terminal 40 can be executed by hardware or software. In a case where the series of processing is executed by software, a program that configures the software is installed in a general-purpose computer or the like.

Figure 12:
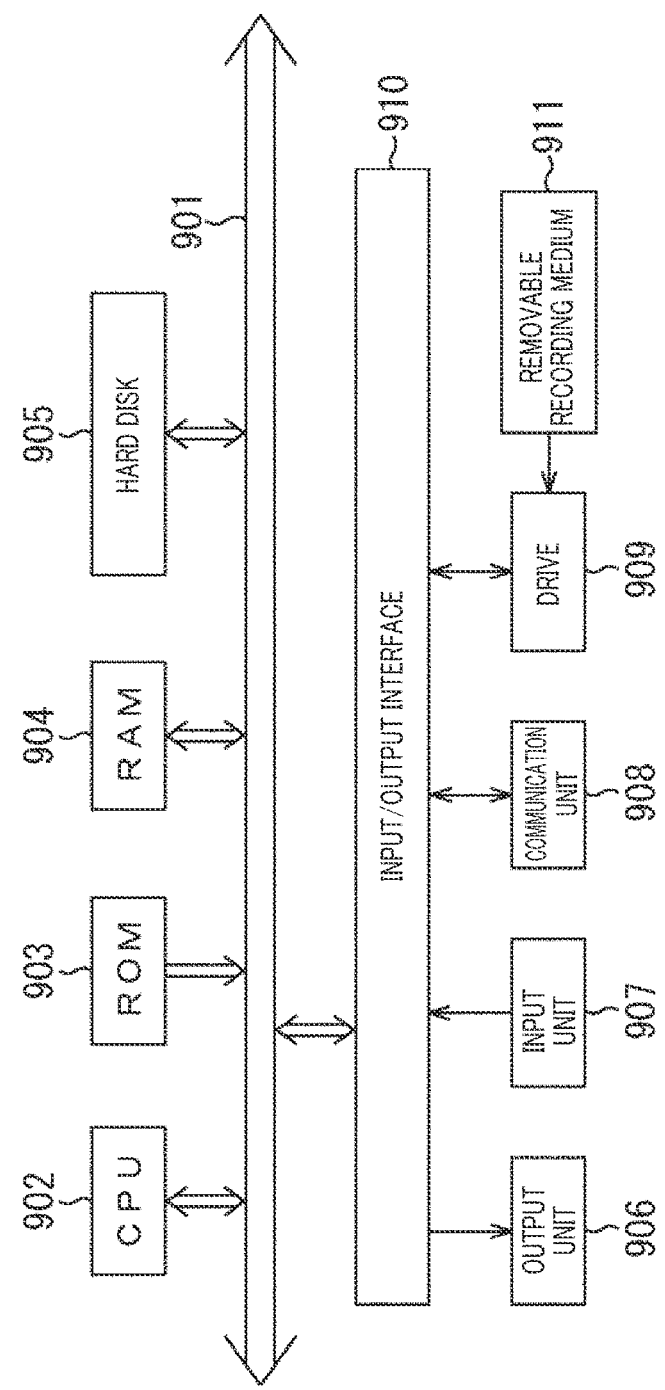
FIG. 12 is a block diagram showing an example of a configuration of one embodiment of a computer to which the present technology is applied.

FIG. 12 is a block diagram showing an example of a configuration of an embodiment of a computer in which a program for executing the aforementioned series of processing is installed.

The program can be recorded in advance in a hard disk 905 or a ROM 903 as a recording medium included in the computer.

Alternatively, the program can be stored (recorded) in a removable recording medium 911 driven by a drive 909. This removable recording medium 911 can be provided as so-called package software. Here, there is a flexible disk, a compact disc read only memory (CD-ROM), a magneto optical (MO) disk, a digital versatile disc (DVD), a magnetic disk, a semiconductor memory, or the like, for example, as the removable recording medium 911.

Note that the program can be downloaded to the computer through a communication network or a broadcast network and installed in the hard disk 905 included in the computer in addition to being installed from the aforementioned removable recording medium 911 to the computer. That is, the program can be transmitted from a download site to the computer through an artificial satellite for digital satellite broadcast in a wireless manner or transmitted to the computer through a network such as a local area network (LAN) or the Internet in a wired manner, for example.

The computer includes a central processing unit (CPU) 902 and an input/output interface 910 is connected to the CPU 902 through a bus 901.

When a user operates the input unit 907, or the like to input a command through the input/output interface 910, the CPU 902 executes a program stored in the read only memory (ROM) 903 according to the command. Alternatively, the CPU 902 loads a program stored in the hard disk 905 to a random access memory (RAM) 904 and executes the program.

Accordingly, the CPU 902 performs processing according to the above-described flowcharts or processing executed by components of the above-described block diagrams. In addition, the CPU 902, for example, outputs a processing result from an output unit 906 through the input/output interface 910 or transmits the processing result from a communication unit 908 and additionally records the processing result in the hard disk 905, or the like as necessary.

Note that the input unit 907 is configured as a keyboard, a mouse, a microphone, or the like. In addition, the output unit 906 is configured as a liquid crystal display (LCD), a speaker, or the like.

Here, processing executed by a computer according to a program is not necessarily performed according to a sequence described as a flowchart in the present description. That is, processing executed by a computer according to a program also includes processing executed in parallel or individually (e.g., parallel processing or processing according to objects).

In addition, a program may be processed by a single computer (processor) or may be processed by a plurality of computers in a distributed manner. Further, a program may be transmitted to a distant computer and executed.

Further, in the present description, the system means a set of a plurality of components (devices, modules (parts), etc.), and it does not matter whether or not all the components are arranged in a single housing. Therefore, a plurality of devices housed in separate housings and connected via a network, and a single device in which a plurality of modules are housed in a single housing are both the system.

Note that embodiments of the present technology are not limited to the above-mentioned embodiments and can be modified in various manners without departing from the gist of the present technology.

For example, the present technology may have a cloud computing configuration in which one function is shared with and processed by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

The effects described in the present description are merely illustrative and not restrictive, and other effects may be obtained.

Note that the present technology can employ the following configurations.

<1>

An information processing device including:

a position-related information acquisition unit configured to acquire position-related information about a relative position or direction with respect to a vehicle; and a display controller configured to display a combined image obtained by combining a defect image representing a position of a sensor having a defect from among sensors mounted on the vehicle with a vehicle image reflecting the vehicle in response to the position-related information.

<2>

The information processing device according to <1>, wherein the display controller displays the combined image obtained by combining an image representing a relative position of the information processing device with respect to the vehicle and the defect image with the vehicle image overlooking the vehicle in response to the position-related information.

<3>

The information processing device according to <1>, wherein the display controller displays the combined image obtained by combining the defect image with the vehicle image of the vehicle viewed at a position of the information processing device in response to the position-related information.

<4>
The information processing device according to <3>, wherein
the vehicle image is computer graphics (CG) of the vehicle viewed at the position of the information processing device or a captured image obtained by capturing an image of the vehicle using a camera at the position of the information processing device.

<5>
The information processing device according to <1>, wherein
the display controller switches
bird's eye view display for displaying the combined image obtained by combining an image representing a relative position of the information processing device with respect to the vehicle and the defect image with the vehicle image overlooking the vehicle,
virtual reality (VR) display for displaying the combined image obtained by combining the defect image with computer graphics (CG) of the vehicle viewed at the position of the information processing device, and
augmented reality (AR) display for displaying the combined image obtained by combining the defect image with a captured image obtained by capturing an image of the vehicle using a camera at the position of the information processing device.

<6>
The information processing device according to <5>, wherein
the display controller
performs the bird's eye view display when the sensor having the defect is not viewed at the position of the information processing device, and
performs the VR display or the AR display when the sensor having the defect is viewed at the position of the information processing device.

<7>
The information processing device according to <5>, wherein
the display controller performs the VR display or the AR display in response to brightness of the captured image.

<8>
The information processing device according to any one of <1> to <7>, wherein
the vehicle causes light-emitting parts around the sensor having the defect to be turned on.

<9>
The information processing device according to <8>, wherein
the vehicle causes the light-emitting parts to be turned off when the defect of the sensor having the defect has been eliminated.

<10>
The information processing device according to <8> or <9>, wherein
the sensor includes the light-emitting parts.

<11>
The information processing device according to any one of <1> to <10>, wherein
the sensor is a camera.

<12>
The information processing device according to any one of <1> to <11>, wherein
the defect is dirt on the sensor.

<13>
The information processing device according to <12>, wherein
the defect image includes an image representing a position of the dirt on the sensor having the dirt.

<14>
The information processing device according to any one of <1> to <13>,
which is a portable terminal.

<15>
An information processing method including:
acquiring position-related information about a relative position or direction with respect to a vehicle; and
displaying a combined image obtained by combining a defect image representing a position of a sensor having a defect from among sensors mounted on the vehicle with a vehicle image reflecting the vehicle in response to the position-related information.

<16>
An information processing system including:
a sensor configured to be mounted on a vehicle;
a defect detector configured to detect a defect of the sensor;
a display unit configured to display an image;
a position-related information acquisition unit configured to acquire position-related information about a relative position or direction with respect to the vehicle; and
a display controller configured to display a combined image obtained by combining a defect image representing a position of a sensor having a defect from among sensors mounted on the vehicle with a vehicle image reflecting the vehicle in response to the position-related information.

REFERENCE SIGNS LIST

1 Vehicle
10 Vehicle control device
$20_1$, $20_2$ On-board light
$30_1$ to $30_5$ Sensor
40 Vehicle exterior terminal
111 Display unit
112 Input unit
113 Information processing unit
114, 115, 141 Communication unit
142 Information processing unit
143 Input unit
144 Camera
145 Display unit
151 Image processor
152 position-related information acquisition unit
153 Image generator
154 Display controller
155 Controller
200 Optical sensor
201 Lens
202 Substrate
203 Light-emitting part
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An information processing device, comprising:
a display screen; and
a processor configured to:
acquire position-related information about one of a relative position of the information processing device with respect to a vehicle or a direction of the information processing device with respect to the vehicle;
generate a defect image representing a position of a sensor having a defect from among a plurality of sensors that is mounted on the vehicle, wherein the generation of the defect image is based on the position-related information;
combine the defect image and a vehicle image to obtain a combined image,
wherein the vehicle image displays the vehicle;
control the display screen to display the combined image;
control the display screen to switch among an augmented reality (AR) display, a bird's eye view display, and a virtual reality (VR) display for the display of the combined image;
control the display screen to perform the bird's eye view display in a case where the sensor having the defect is not viewed at a position of the information processing device; and
control the display screen to perform one of the VR display or the AR display in a case where the sensor having the defect is viewed at the position of the information processing device.

2. The information processing device according to claim 1, wherein
the vehicle image further displays the vehicle from a viewpoint overlooking the vehicle, and
the processor is further configured to combine the defect image with the vehicle image to generate the bird's eye view display.

3. The information processing device according to claim 1, wherein
the vehicle image further displays the vehicle viewed at a position of the information processing device, and
the processor is further configured to combine the defect image with the vehicle image to generate the VR display.

4. The information processing device according to claim 3, wherein
the vehicle image is computer graphics (CG) of the vehicle viewed at the position of the information processing device.

5. The information processing device according to claim 1, wherein
the vehicle image further displays the vehicle from a viewpoint overlooking the vehicle,
the bird's eye view display combines the defect image with the vehicle image,
the (VR) VR display combines the defect image with computer graphics (CG) of the vehicle viewed at a position of the information processing device, the AR display combines the defect image with a captured image from a camera at the position of the information processing device, and
the captured image corresponds to the vehicle image.

6. The information processing device according to claim 1, further comprising a camera configured to capture an image, wherein the processor is further configured to control the display screen to perform one of the VR display or the AR display based on a brightness of the captured image.

7. The information processing device according to claim 1, wherein
the vehicle causes at least one light-emitting part associated with the sensor having the defect to be turned on.

8. The information processing device according to claim 7, wherein
the vehicle causes the at least one light-emitting part to be turned off based on elimination of the defect of the sensor.

9. The information processing device according to claim 7, wherein
the sensor includes the at least one light-emitting part.

10. The information processing device according to claim 1, wherein
the sensor is a camera.

11. The information processing device according to claim 1, wherein
the defect is dirt on the sensor.

12. The information processing device according to claim 11, wherein
the defect image includes an image representing a position of the dirt on the sensor having the dirt.

13. The information processing device according to claim 1, wherein
the information processing device is a portable terminal.

14. An information processing method, comprising:
acquiring position-related information about one of a relative position of an information processing device or a direction of the information processing device with respect to a vehicle;
generating a defect image representing a position of a sensor having a defect among a plurality of sensors that is mounted on the vehicle, wherein
the generation of the defect image is based on the position-related information;
combining the defect image and a vehicle image to obtain a combined image, wherein the vehicle image displays the vehicle;
controlling a display screen to display the combined image;
controlling the display screen to switch among an augmented reality (AR) display, a bird's eye view display, and a virtual reality (VR) display for the display of the combined image;
controlling the display screen to perform the bird's eye view display in a case where the sensor having the defect is not viewed at a position of the information processing device; and
controlling the display screen to perform one of the VR display or the AR display in a case where the sensor having the defect is viewed at the position of the information processing device.

15. An information processing system, comprising:
a sensor configured to be mounted on a vehicle;
a first processor configured to detect a defect of the sensor;
a display screen configured to display an image;
a second processor configured to:
acquire position-related information about one of a relative position of an information processing device with respect to the vehicle or a direction of the information processing device with respect to the vehicle;

generate a defect image representing a position of the sensor having the defect, wherein the generation of the defect image is based on the position-related information;

combine the defect image and a vehicle image to obtain a combined image, wherein the vehicle image displays the vehicle;

control the display screen to display the combined image;

control the display screen to switch among an augmented reality (AR) display, a bird's eye view display, and a virtual reality (VR) display for the display of the combined image;

control the display screen to perform the bird's eye view display in a case where the sensor having the defect is not viewed at a position of the information processing device; and control the display screen to perform one of the VR display or the AR display in a case where the sensor having the defect is viewed at the position of the information processing device.

\* \* \* \* \*